US012184658B1

(12) United States Patent
Harlan et al.

(10) Patent No.: US 12,184,658 B1
(45) Date of Patent: Dec. 31, 2024

(54) METHOD AND SYSTEM FOR ALLOWING A CUSTODIAN TO MANAGE A PLURALITY OF USER ACCOUNTS ON A COMPUTING DEVICE VIA A DEVICE APPLICATION

(71) Applicants: Lane Harlan, Vero Beach, FL (US); Arun kumar Arumugam, Malvern, PA (US); Diwakar Manna, Wayne, PA (US)

(72) Inventors: Lane Harlan, Vero Beach, FL (US); Arun kumar Arumugam, Malvern, PA (US); Diwakar Manna, Wayne, PA (US)

( * ) Notice: Subject to any disclaimer, the term of this patent is extended or adjusted under 35 U.S.C. 154(b) by 0 days.

(21) Appl. No.: 18/676,611

(22) Filed: May 29, 2024

(51) Int. Cl.
*G06F 9/451* (2018.01)
*H04L 9/40* (2022.01)
*G06F 3/0481* (2022.01)

(52) U.S. Cl.
CPC ............ *H04L 63/102* (2013.01); *H04L 63/20* (2013.01); *G06F 3/0481* (2013.01); *G06F 9/451* (2018.02)

(58) Field of Classification Search
CPC ....... H04L 63/102; H04L 63/20; H04L 51/04; H04L 61/4555; H04L 41/5093; H04L 67/12; G06F 9/451; G06F 3/0481; G06F 3/1251; G06F 3/04812; G06F 3/0482; G06F 3/0488; G06F 3/0484; G06F 2212/151; G06F 18/20; G06F 21/554; G06N 20/00; G06N 20/10; G06N 20/20; G06Q 20/20; G06Q 20/384; G05B 2219/32158; G05B 19/418; G05B 19/4183; H04M 1/72439; H04M 7/0045; G06V 20/30; G11B 19/025
See application file for complete search history.

(56) References Cited

U.S. PATENT DOCUMENTS

| | | | |
|---|---|---|---|
| 8,718,633 B2 | 5/2014 | Sprigg et al. | |
| 8,769,017 B2 | 7/2014 | Jakobson | |
| 9,088,861 B2 | 7/2015 | Prakash et al. | |
| 9,300,675 B2 | 3/2016 | Vignisson et al. | |
| 9,588,637 B2 | 3/2017 | Momchilov et al. | |
| 9,912,687 B1 * | 3/2018 | Wescoe | H04L 67/01 |

(Continued)

FOREIGN PATENT DOCUMENTS

| | | | | |
|---|---|---|---|---|
| AU | 2022297419 A1 * | 10/2023 | ............ | G06Q 30/01 |
| BR | 102015030632 A2 * | 6/2017 | | |

(Continued)

*Primary Examiner* — Steven P Sax
(74) *Attorney, Agent, or Firm* — The Powers IP Law Firm

(57) ABSTRACT

A computer-implemented method is provided for allowing a custodian to manage a plurality of user accounts on a computing device via a device application. The plurality of user accounts includes a custodian user account and a shadowed user account. The computer-implemented method includes displaying a custodian user account on a graphical user interface of a computing device responsive to the device application being accessed on the computing device, managing the custodian user account in a first account context, and simultaneously: a) changing from the custodian user account to the shadowed user account via the device application, and b) changing the operating mode in the device application from the first account context to a second account context such that the shadowed user account is shadowed on the computing device by the custodian at less than full account control.

18 Claims, 12 Drawing Sheets

(56) References Cited

U.S. PATENT DOCUMENTS

| | | | | |
|---|---|---|---|---|
| 10,027,701 | B1 * | 7/2018 | Campbell | H04L 69/22 |
| 10,129,195 | B1 * | 11/2018 | Jakobsson | G06Q 10/107 |
| 10,298,598 | B1 * | 5/2019 | McClintock | H04L 63/1483 |
| 10,809,890 | B1 * | 10/2020 | Krawczyk | G06F 16/438 |
| 11,395,029 | B2 | 7/2022 | Sharma | |
| 11,734,032 | B1 * | 8/2023 | Brinkhoff | G06F 3/0481 |
| | | | | 715/204 |
| 11,871,064 | B2 | 1/2024 | Sharma | |
| 11,949,722 | B1 * | 4/2024 | Mavuduri | H04L 67/1095 |
| 12,069,043 | B2 * | 8/2024 | Kong | H04L 63/0807 |
| 2017/0039867 | A1 * | 2/2017 | Fieldman | G09B 7/00 |
| 2017/0324758 | A1 * | 11/2017 | Hart | H04L 63/0428 |
| 2018/0091546 | A1 * | 3/2018 | Davidson | H04L 63/1425 |
| 2019/0327292 | A1 * | 10/2019 | Ziebell | H04L 67/53 |
| 2020/0053111 | A1 * | 2/2020 | Jakobsson | H04L 63/1416 |
| 2020/0195694 | A1 * | 6/2020 | Kalinin | G06Q 10/107 |
| 2023/0010945 | A1 * | 1/2023 | Soryal | G06N 20/00 |
| 2023/0222929 | A1 * | 7/2023 | LaBarge | G09B 5/06 |
| 2023/0283521 | A1 * | 9/2023 | Berger | H04L 63/20 |
| | | | | 709/223 |
| 2024/0171558 | A1 * | 5/2024 | Diffloth | H04L 63/08 |
| 2024/0250988 | A1 * | 7/2024 | Chapman | H04L 63/1491 |

FOREIGN PATENT DOCUMENTS

| | | | | | |
|---|---|---|---|---|---|
| CN | 108874619 | B | * | 9/2023 | G06F 11/302 |
| CN | 116920415 | B | * | 12/2023 | |
| JP | 7528166 | B2 | * | 8/2024 | |
| WO | WO-2016210327 | A1 | * | 12/2016 | G06F 21/6218 |
| WO | WO-2022203837 | A1 | * | 9/2022 | H04L 63/0435 |
| WO | WO-2023016126 | A1 | * | 2/2023 | |
| WO | WO-2023053101 | A1 | * | 4/2023 | |
| WO | WO-2024130127 | A1 | * | 6/2024 | |

* cited by examiner

METHOD AND SYSTEM FOR ALLOWING A CUSTODIAN TO MANAGE A PLURALITY OF USER ACCOUNTS ON A COMPUTING DEVICE VIA A DEVICE APPLICATION

BACKGROUND

With the ever-growing popularity of cyber communication over services such as messaging, social media applications, and gaming platforms, the need to oversee and manage user activity is greater than ever before. Many children in today's world, for example, use a variety of different devices such as laptops, tablets, mobile phones, gaming consoles, smartwatches, and the like, to communicate with other children. However, by employing these devices and services, children expose themselves to a number of potential harms. The list of potential harms is virtually limitless, but key harms that have driven news headlines over the past decade include exposure to sexually explicit content, sexting, sextortion, cyber-bullying, grooming by predators, self-harm, suicidal ideation, unscrupulous advertising, and recruitment by hate groups, fundamentalist groups, and terrorist organizations. Moreover, children are frequently exposed to potentially dangerous content or actors online, but do not possess the maturity, knowledge, understanding, or experience to adequately protect themselves.

Known systems and methods of allowing parents or other custodians to manage and oversee the communication activity of their children are deficient in several regards. First, many businesses treat teenagers (ages 13 and up) as adults, as it pertains to access to their applications, whether it be messaging, social media, gaming, or other applications. When this is done, the ability of parents to safely manage the content and connections that a given child is exposed to is compromised. Parents or guardians, in these instances, are relegated to simply another "connection" that the child happens to be associated with. In applications where the parent does have some supervisory capabilities over teens, such abilities are drastically limited in scope and typically involve only cursory oversight functions.

Second, irrespective of the age of the child, whether pre-teen or teen, existing systems and methods require parents or guardians to complete numerous cumbersome steps or activities to function in an oversight capacity for their children, and even then, oversight capabilities are relatively limited. For example, for a parent of three children to oversee the messaging activities for their children using the default messaging application of known phone platforms requires that the parent either confiscate the phone device from each child to review their messaging history, or to maintain an instance of the messaging application on a separate computer for monitoring purposes. In the latter scenario, the parent must log in and log out of the messaging application uniquely for each child to see a given child's messaging history. Even with this monitoring approach, the parent has no specific notice or warning of concerning contacts or content (he or she would need to review full message histories), and even then would still not be privy to messages that the child has deleted from his/her history before the parent's directed instance of monitoring. Third-party monitoring applications can somewhat obviate this problem, but have significant limitations themselves.

Moreover, for the same parent, if his/her children were allowed on Facebook, then s/he would have to navigate as follows. Teenagers ages 13-18 years old can create their own accounts and can approve/reject parental supervision. Even when a teenager "approves" supervision, that supervision is limited, effectively, to contacts only. Furthermore, for children under 13 on Facebook, children are limited to messaging functionality only. For a parent to monitor the messaging activities for pre-teen children, the parent must install 2 or 3 different applications on a device to allow full monitoring. The first application maintains a limited parental dashboard, the second application contains notifications and allows the parent to message with the child, and the third application is an instance of the messaging application itself which the parent can use to switch between children to see a given child's actual messages. In an example where a single parent is monitoring three children, the parent must navigate between three different application interfaces to manage and oversee pre-teen messaging across three children. For children under 13, parental controls are slightly more robust for pre-teens than for teens, in that a parent can accept or reject connections for the child, and the parent can more easily switch between the messaging instances of each child to see his/her messaging history. Additionally, pre-teens are not allowed to delete messages like their teen siblings. The top ten messaging, social media, and gaming platforms that contain direct messaging or social media-esq capabilities operate in a largely similar fashion to the aforementioned example.

It is with respect to these and other considerations that the instant disclosure is concerned.

SUMMARY

In one aspect of the disclosed concept, a computer-implemented method is provided for allowing a custodian to manage a plurality of user accounts on a computing device via a device application. The plurality of user accounts includes a custodian user account and a shadowed user account or accounts. The computer-implemented method includes displaying a custodian user account on a graphical user interface of a computing device responsive to the device application being accessed on the computing device, managing the custodian user account in a first account context, and simultaneously: a) changing from the custodian user account to the shadowed user account via the device application, and b) changing the operating mode in the device application from the first account context to a second account context such that the shadowed user account is shadowed on the computing device by the custodian at less than full account control.

In another aspect of the disclosed concept, a system for allowing a custodian to manage a plurality of user accounts comprising a custodian user account and a shadowed user account is provided. The plurality of user accounts includes a custodian user account and a shadowed user account or accounts. The example system includes a computing device for running the device application, and the computing device is programmed to display the custodian user account on a graphical user interface responsive to the device application being accessed, manage the custodian user account in a first account context, and simultaneously: a) change from the custodian user account to the shadowed user account via the device application, and b) change the operating mode in the device application from the first account context to a second account context such that the shadowed user account is shadowed on the computing device by the custodian at less than full account control.

DETAILED DESCRIPTION

Figure 1:
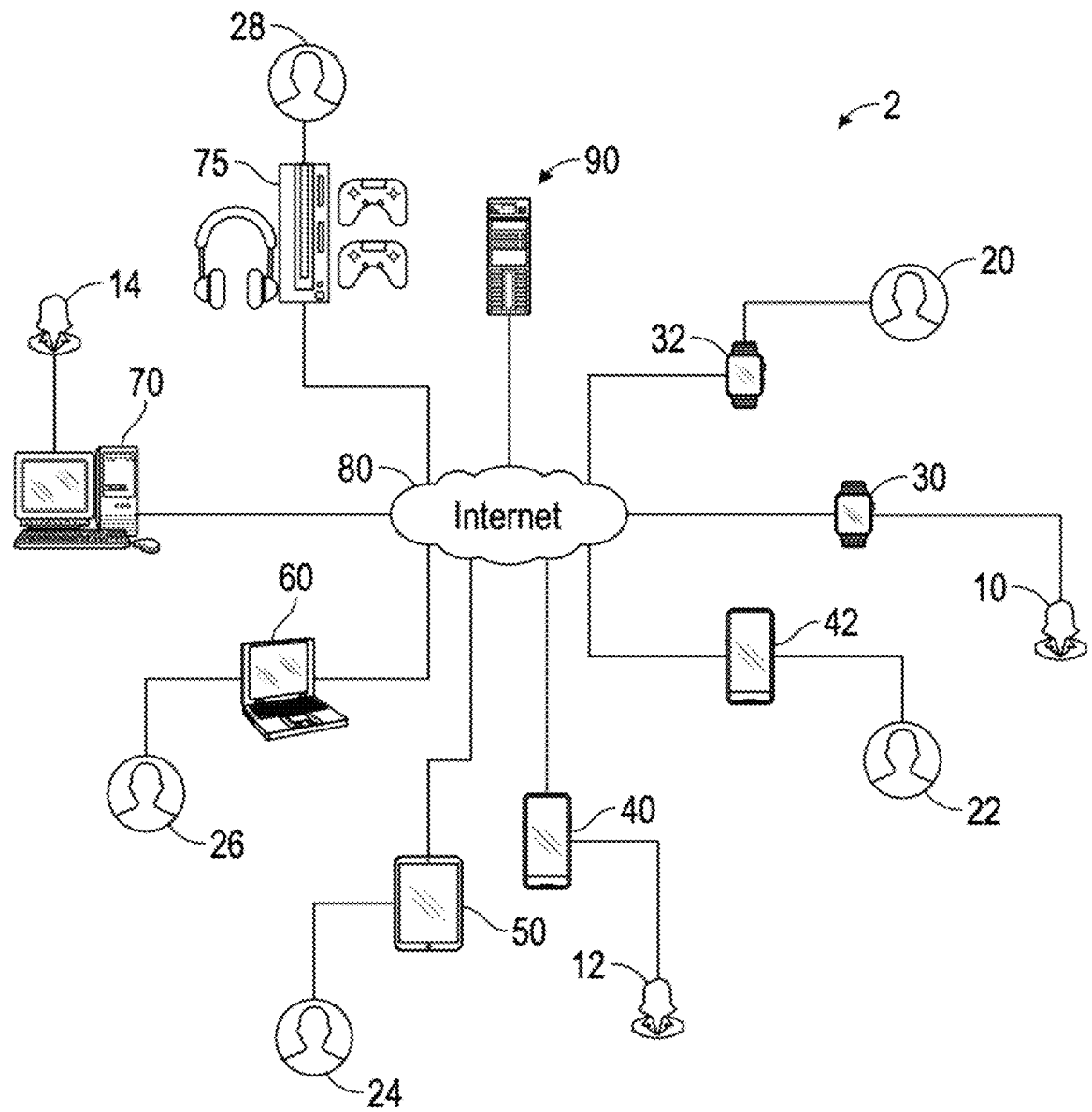
FIG. 1 is a schematic view of a system for allowing a custodian to manage a plurality of user accounts, in accordance with one non-limiting embodiment of the disclosed concept.

As employed herein, the term "number" shall mean one or an integer greater than one (i.e., a plurality).

As employed herein, the term "shadowed user account" shall mean a user account in a device application, including social media and gaming applications, that is managed at less than full account control. One example of how a shadowed user account is managed at less than full account control includes managing a messaging feature of a device application in a read-only mode. Other examples include being provided with "indicators" (e.g., different colored lights, shapes, symbols, or combinations thereof), which may be "shadow indicators". "Shadow indicators" may include indicators in a device application for custodians of "shadowed user accounts" to be provided with, in one example, a predetermined indication of a type of content in a conversation thread, social media post, song in a music library, video, tv show, book, video game, (e-commerce), website, and the like. Non-limiting examples of custodian/shadowed user relationships in accordance with the disclosed concept include parent-child relationships, conservatorships, caregiver/dependent relationships, and legal guardianships.

As employed herein, the term "custodian" shall mean a person who has oversight privileges with respect to a ward. Non-limiting examples of how a person may become a "custodian" with respect to another person include through legal or contractual (verbal, written, or otherwise) arrangements.

As employed herein, the term "account context" shall mean an operating mode for a device application. As employed herein, the phrase "first account context" may mean an operating mode corresponding to full account control, where a user is not inhibited in accessing any of the capabilities of a device application, and the phrase "second account context" may mean an operating mode for a device application corresponding to less than full account control, where a user may not have full access to all capabilities of a device application.

As employed herein, the term "computing device" shall mean a device including a "processor" and a "memory," that is configured to connect to other computing devices via a network or internet. "Processors" in accordance with the disclosed concept may be commercially available general-purpose processors, such as a processor from the Intel® or ARM® architecture families. "Memory" in accordance with the disclosed concept may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. Non-limiting examples of "computing devices" in accordance with the disclosed concept include smart devices such as smart watches, smart mobile phones, tablets, gaming consoles, laptop computers, and desktop computers. Computing devices in accordance with the disclosed concept are programmed to perform computer-implemented methods as disclosed herein.

As discussed above, the need exists for custodians (e.g., parents, guardians, adults over the age of 18, or others charged with the care of another individual) to monitor the online activity of their wards, including children, more carefully, as it pertains to cyber communication. More particularly, in many of today's social media applications, parents and other custodians cannot review any content or messages coming from or directed to their teenage children. Nor are parents or custodians able to see the child's searches or any concerning content the child may have been exposed to resulting from the platform's algorithms. To monitor online communication for a group of teenagers, a parent would be required to maintain usernames and passwords for each of their children on known platforms and log in as a given teenager on a separate device for content monitoring purposes. This is similar to the approach for monitoring messaging described in an earlier example.

Again, even in this scenario, parents would have no specific notice or warning of concerning content. The parent would be dependent on the child to report concerning content or messages, or the parent would need to review all content and messages coming over the platform for the child. Again, if the child were to delete content or messages before a directed instance of monitoring, the parent would be unaware. Third-party monitoring applications, described later, can somewhat obviate this problem, but have significant limitations themselves. What limited teen supervisory capabilities that do exist on Facebook, for example, are obfuscated within the primary application user interface. A parent must navigate multiple levels within the application (Menu>Settings>Supervision) just to get to a list of his/her teenage children. The parent is then provided with information such as average application usage time and can see the child's contacts. A parent can set time limits, but beyond that, such as adjusting content settings, the parent is informed "Only 'Your Child' can change this setting."

Furthermore, consistent across all these scenarios, whether teen or pre-teen, is that custodians, such as parents, are not proactively notified of questionable or concerning content, and that they must be directly logged in to each application as the actual child to review a given child's content or messaging history. This form of parental oversight can be categorized as "brute force" oversight. It requires that the parent maintain access to usernames and passwords for each child, directly access each child's account on a given platform, and then manually review each content area, including ALL messages, ALL social media feeds, ALL searches, etc. to get a complete view and assess any risks or concerns for each child. It's a daunting and time-consuming task. To achieve even sub-optimal levels of oversight, parents often must undesirably move between multiple applications and multiple child accounts to oversee their children's cyber activities.

The primary alternative to the brute force oversight approach is for a parent to install third-party tools to monitor the online activity of their children. These tools, while quite useful and effective at identifying questionable or concerning content, are drastically limited in their implementation because they require significant effort for a parent to manage. For the most popular U.S. phone platform, for example, a parent must install the specialized monitoring software on a separate system, retrieve each child's phone, backup each phone to the same computer where the monitoring software was installed, and then have the software scan the backups and provide reports. Considering the number and type of steps involved, this approach has a very low market penetration. Specialized monitoring software is either too time-intensive for most parents or too technically complex for others.

The disclosed concept provides an improved system and computer-implemented method to allow parents and other custodians to manage and oversee the cyber activity related to their children where communications and/or content is a concern. For communications, this might include messaging, social media activity, direct messaging within gaming platforms, or similar. For content, this might include music, videos, video games, tv shows, books, (e-commerce), and websites. These controls would allow parents to better protect and keep safe their children.

It does this, in one example, through a device application 90 (FIG. 1), which may be a social media application, gaming application, or other similar application. When different users employ the device application 90, several important benefits may be provided to custodians, including an ability to shadow (e.g., oversee and manage in a read only "shadow" mode) the activity of their wards (e.g., children), be provided with different indicators of content in messages, social media feeds, music libraries, videos, and the like, as well as controls to be able to block, report, flag, etc. certain content, and be provided with hyperlinks in a dashboard page to quickly find inappropriate content in their children's online activity. Furthermore, the device application 90 advantageously allows parents to manage their own user accounts in a first account context corresponding to full account control, and then manage the user accounts of their wards (e.g., children) by simultaneously switching to a second account context (e.g., less than full account control). FIGS. 1-11 will make clear this functionality.

FIG. 1 shows an example system 2 for allowing a number of custodians 10, 12, 14 to manage a plurality of user accounts of a plurality of users 20, 22, 24, 26, 28. In one example, the custodians 10, 12, 14 are parents or other guardians, and the users 20, 22, 24, 26, 28 are children or other wards (e.g., in one example under the age of 18 years old). The example system 2, as will be discussed below, provides a way in which cyber communication of the users 20, 22, 24, 26, 28 can be better managed and overseen by the custodians 10, 12, 14, thus giving the custodians 10, 12, 14 long needed control over their children's cyber activities.

As shown in FIG. 1, the custodians 10, 12, 14 and the users 20, 22, 24, 26, 28 are each associated with (e.g., configured to use) a corresponding plurality of computing devices in the form of smart watches 30, 32 for the first custodian 10 and the first user 20, mobile phones 40, 42 for the second custodian 12 and the second user 22, a tablet 50 for the third user 24, a laptop 60 for the fourth user 26, a desktop computer 70 for the third custodian 14, and a gaming console 75 for the fifth user 28. Furthermore, the computing devices 30, 32, 40, 42, 50, 60, 70, 75 are configured to be connected to one another over a network or internet 80 (this connection could be wired or wireless). Moreover, in accordance with the disclosed concept, each of the computing devices 30, 32, 40, 42, 50, 60, 70, 75 are configured to access a device application 90, which may be a communication application such as a social media, messaging, and/or gaming application, or could be an application that provides content such as music, videos, books, video games, and the like. This application communicates through the internet 80, and in one example through an app store on the computing devices 30, 32, 40, 42, 50, 60, 70, 75.

As will be discussed below, the device application 90 advantageously allows the user accounts associated with the users 20, 22, 24, 26, 28 to be shadowed user accounts, thereby giving the custodians 10, 12, 14 greater ability to manage and oversee their activity in the device application 90. More specifically, the device application 90 is configured to have an operating mode configured to change between the first account context corresponding to full account control, and the second account context corresponding to less than full account control. In short, each of the custodians 10, 12, 14 are configured to manage their own user accounts in the first account context, and also are able to manage the shadowed user accounts associated with the users 20, 22, 24, 26, 28 in the second account context. And as will be discussed below, the custodians 10, 12, 14 can also move between such user accounts without intermediate steps being taken, such as a separate login process. That is, with selection they can move between custodian and different shadowed user accounts.

Additionally, although the disclosed concept is being described in association with the computing devices 30, 32, 40, 42, 50, 60, 70, 75 for the custodians and users 10, 12, 14, 20, 22, 24, 26, 28, it will be appreciated that suitable alternative arrangements are contemplated, including any of the custodians and users 10, 12, 14, 20, 22, 24, 26, 28 accessing the device application 90 from any of a plurality of smart devices, such as the computing devices 30, 32, 40, 42, 50, 60, 70, 75, or other smart devices configured to access the device application 90 through the internet 80. Understanding of the functionality of the device application 90 (FIG. 1) will be more apparent via discussion of FIGS. 2-11.

Figure 2:
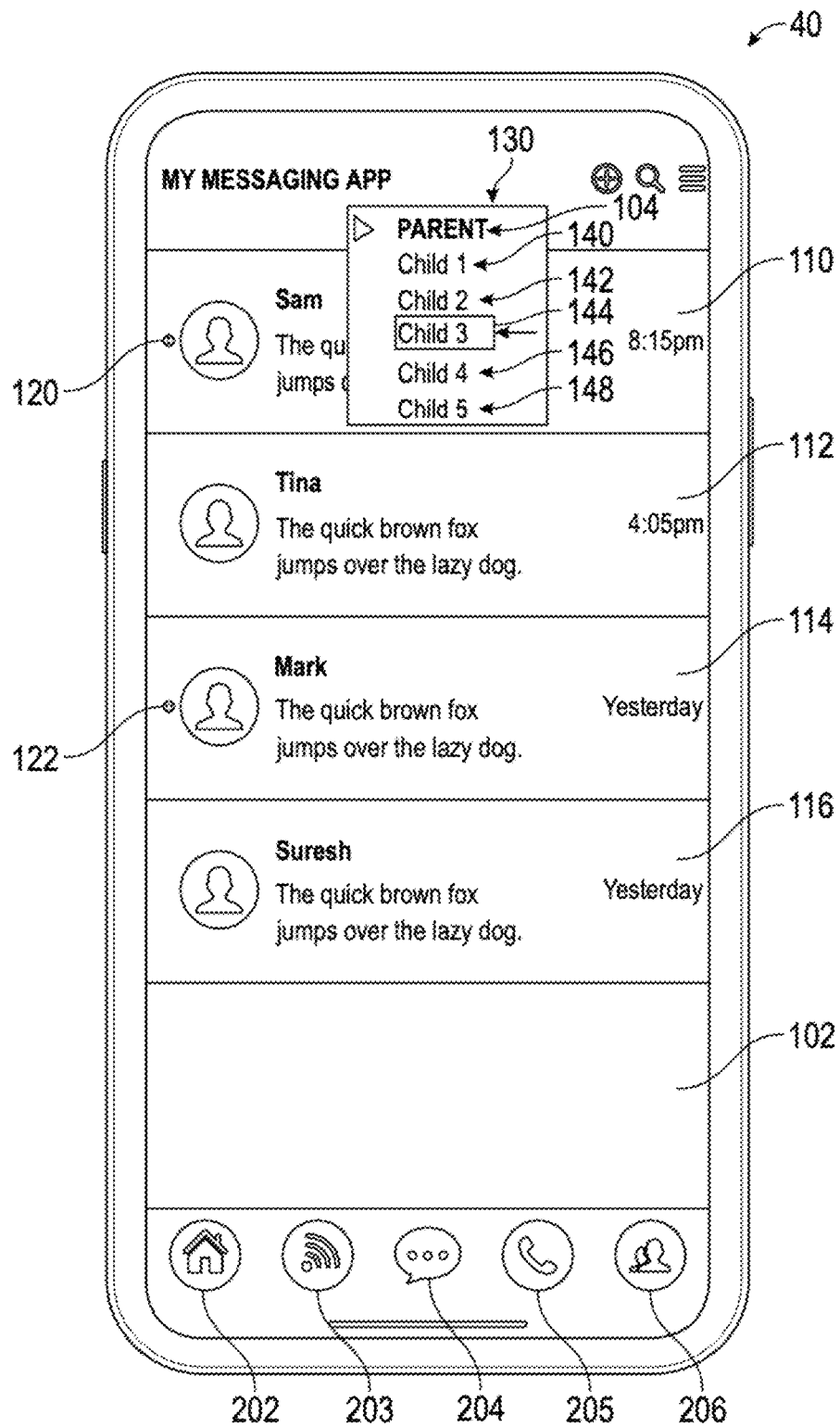
FIGS. 2 and 3 are simplified views of a graphical user interface of a computing device for the system of FIG. 1, shown displaying a messaging home page of a custodian user account and a messaging home page for a shadowed user account managed by the custodian user account, respectively.

FIG. 2 shows the mobile phone 40 for the custodian 12 (FIG. 1). As shown, the mobile phone 40 includes a graphical user interface 102 that is displaying a custodian user account 104 for the custodian 12 (FIG. 1). As can be appreciated, the custodian user account 104 is associated with a number of custodian contacts 110, 112, 114, 116, and in one example, the device application 90 (FIG. 1) allows for communication (e.g., text and video message communication) between the custodian 12 and each of the number of custodian contacts 110, 112, 114, 116. Also shown in FIG. 2 are a number of custodian indicators 120, 122. When the custodian indicators 120, 122 are displayed with the custodian contacts 110, 112, 114, 116 on the graphical user interface 102, the custodian indicators 120, 122 are each integrated with the first account context as part of the first account context operating mode. Furthermore, in one example they each correspond to an unread message. It will be appreciated that the example computer-implemented method includes displaying first content on the graphical user interface 102 in a read and write (e.g., communications can be sent, received, and viewed) mode responsive to selecting a first contact 110 of the number of custodian contacts 110, 112, 114, 116.

Continuing to refer to FIG. 2, at the top of the graphical user interface 102 is a dropdown menu 130. Responsive to the custodian 12 selecting the dropdown menu 130 causes a number of shadowed user accounts (e.g., his or her children's accounts) 140, 142, 144, 146, 148 to be displayed. Furthermore, after the custodian 12 has selected one of the shadowed user accounts 140, 142, 144, 146, 148, subsequent selecting the dropdown menu 130 and a different one of the shadowed user accounts 140, 142, 144, 146, 148 will automatically cause conversation data for that shadowed user account to be displayed. Moreover, it will be appreciated that the shadowed user accounts 140, 142, 144, 146, 148 may correspond to any of the users 20, 22, 24, 26, 28 from FIG. 1, and/or other users, each of which may be children under the age of 18 or other wards associated with the custodians 10, 12, 14. When the custodian 12 selects or touches one of the shadowed user accounts 140, 142, 144, 146, 148, a number of events happen simultaneously (i.e., at the same time).

Figure 3:
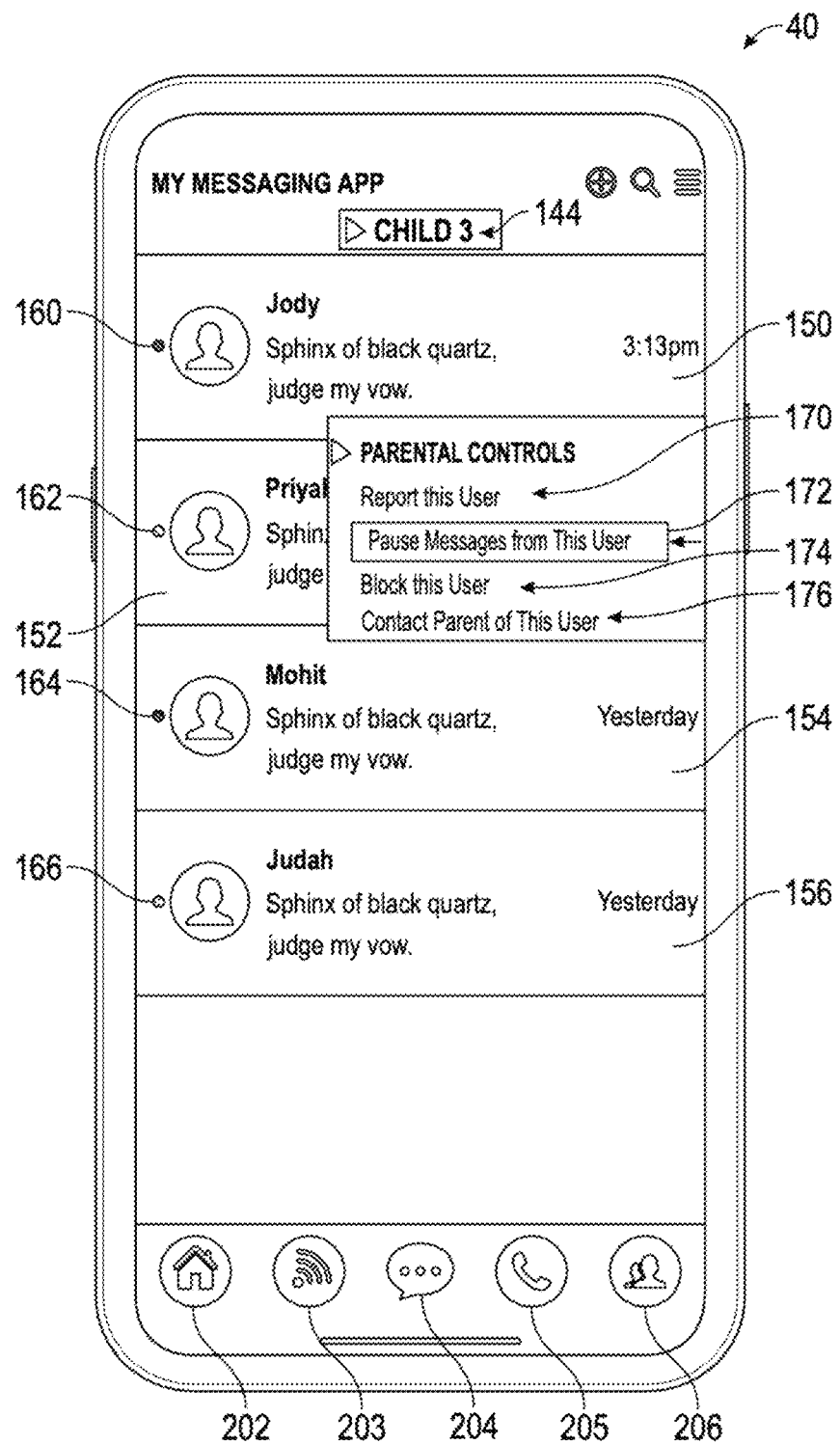

First, the device application 90 causes the custodian user account 104 associated with the custodian 12 to change to one of the shadowed user accounts 140, 142, 144, 146, 148. In the example of FIG. 2, the third shadowed user account 144 is selected, and as such, the graphical user interface 102 changes to display the third shadowed user account 144 associated with the user 20 (FIG. 1), as shown in FIG. 3. Second, at the same time as the third shadowed user account 144 is being displayed, the operating mode in the device application 90 changes from the first account context to the second account context such that the shadowed user account 144 is shadowed on the computing device by the custodian 12 at less than full account control. In one example, this changing of the device application 90 from the custodian user account 104 to the shadowed user account 144 is performed without a login process being performed on the computing device. This is a significant advantage over today's art, which typically requires parents and other custodians to perform separate logins to access their child's account, and/or commonly require other additional burdensome steps, as discussed above, to be taken.

Additionally, by switching from the first account context to the second account context, the custodian 12 can advantageously manage the shadowed user account 144 of the user 20 with greater oversight than today's art. In one example, the custodian 12 can see exactly what the user 20 of the shadowed user account 144 sees. That is, the disclosed method may include displaying a representation of the shadowed user account 144 on the graphical user interface 102, and the representation is preferably the same as a representation of the shadowed user account 144 displayed on a graphical user interface of the computing device 32 of the user 20 of the shadowed user account 144. Thus, the custodian 12 is allowed to see on the computing device 40 what the user 20 of the shadowed user account 144 sees on the computing device 32. This is significant and applies in messaging contexts, as well as social media, music, video, book, gaming, magazine, tv show, e-commerce, website, and other capabilities that are contemplated for use with the device application 90. Additionally, in today's art, as discussed above, children will often be exposed to inappropriate content, even on the cover of a book that they view in certain applications (not shown). However, in accordance with the disclosed concept, the custodian 12 and the other custodians 10, 14 are each able to see in the second account context exactly what their children or other wards see on their respective devices, thus making oversight and protection much simpler.

Continuing to refer to FIG. 3, the shadowed user account 144 is associated with a number of shadowed contacts 150, 152, 154, 156, and the custodian 12 may view (e.g., in a read-only mode) cyber communication associated with each of the shadowed contacts 150, 152, 154, 156. Additionally, managing the shadowed user account 144 may further include displaying the number of shadowed contacts 150, 152, 154, 156 and a number of shadow indicators 160, 162, 164, 166 on the graphical user interface 102 responsive to changing from the custodian user account 104 to the shadowed user account 144. In one example, the number of shadow indicators 160, 162, 164, 166 are integrated with the second account context and are of a different type than the number of custodian indicators 120, 122.

More specifically, while the custodian indicators 120, 122 preferably correspond to an unread message between the custodian 12 and one of the custodian contacts 110, 112, 114, 116, the shadow indicators 160, 162, 164, 166 are preferably configured to indicate to the custodian 12 what type of content is associated with each of the shadowed contacts 150, 152, 154, 156. In one example, each of the shadow indicators 160, 162, 164, 166 correspond to different types of content. This is highly beneficial, as it will provide the custodian 12 with an indication of what type of content is being exchanged between his or her child and others.

Accordingly, the shadow indicators 160, 162, 164, 166 may be of a plurality of different types each corresponding to a type of data. In the example of FIG. 3, the first and third shadow indicators 160, 164 are the same, and the second and fourth shadow indicators 162, 166 are each different from each other and different from the first and third shadow indicators 160, 164. As such, the first and third shadow indicators 160, 164 may correspond to first predetermined data (e.g., clean content) associated with the first and third contacts 150, 154, the second shadow indicator 162 may correspond to second predetermined data (e.g., highly concerning content) associated with the second contact 152, and the fourth shadow indicator 166 may correspond to third predetermined data (e.g., somewhat concerning content) associated with the fourth contact 156. It will be appreciated that the first, second, and third predetermined data may all be determined via an algorithm.

An example algorithm in accordance with the disclosed concept may scan for inappropriate language. It may complete sentiment analysis such as, assess a user's mood. This is highly important for protecting user's from, for example, suicidal ideation. The algorithm may also scan for mature themes and pornographic content (incoming e.g. shared photos, or outgoing e.g. sexting). The algorithm may also identify grooming language used by child predators, bullying language, language used by fundamentalist or terrorist groups for recruitment. In combination with sentiment analysis, this could even predict a given user's likelihood to sympathize with the recruiting organization In addition, artificial intelligence may be employed to understand conversations and identify questionable content, such that the system 2 can be equipped to scan applicable content. Accordingly, not only is the custodian 12 able to view content associated with his or her child's or ward's conversations, he or she is advantageously provided with an indication of what is going on in the conversation thread, e.g., how concerning is the content.

Accordingly, the first, second, and third predetermined data may all be different from one another, in order for the custodian 12 to receive different indications of the content associated with his or her child's communications. In one example, the shadow indicators 160, 162, 164, 166 are different colors, for example Red to indicate highly concerning content, Yellow to indicate somewhat concerning and cautionary content, and Green to indicate the absence of questionable content. Other types of indicators are contemplated, such as indicators having different shapes (e.g., circles, arrows, flags, exclamation points), or other symbols, and/or different combinations of symbols and colors. It will be appreciated that the example method further includes displaying second content on the graphical user interface 102 in a read-only mode responsive to selecting one of the number of shadowed contacts 150, 152, 154, 156, the second content corresponding to at least one of text data, image data, audio data, and video data. In other words, the parent can simply view the conversation thread, which may include text, video, and image information.

Continuing to refer to FIG. 3, in addition to employing the shadow indicators 160, 162, 164, 166 which provide an indication of content in a given conversation thread, the device application 90 (FIG. 1) also provides a mechanism for the custodian 12 to actively monitor the activity of the shadowed user account 144, that is, his or her child's account. Specifically, one example method of allowing the custodian 12 to manage the shadowed user account 144 includes displaying a number of custodian control options 170, 172, 174, 176 on the graphical user interface 102 responsive to selecting (e.g., right-clicking, toggling, etc.) on one of the contacts 150, 152, 154, 156. The custodian control options 170, 172, 174, 176 may each be integrated with the second account context such that they are a part of the operating mode of the device application 90 when the custodian 12 is managing the shadowed user account 144 and the other shadowed user accounts 140, 142, 146, 148. Moreover, although FIG. 3 depicts the custodian control options as a "report this user" option 170, a "pause messages" option 172, a "block user" option 174, and a "contact parent of user" option 176, other custodian control options are contemplated.

Figure 4:
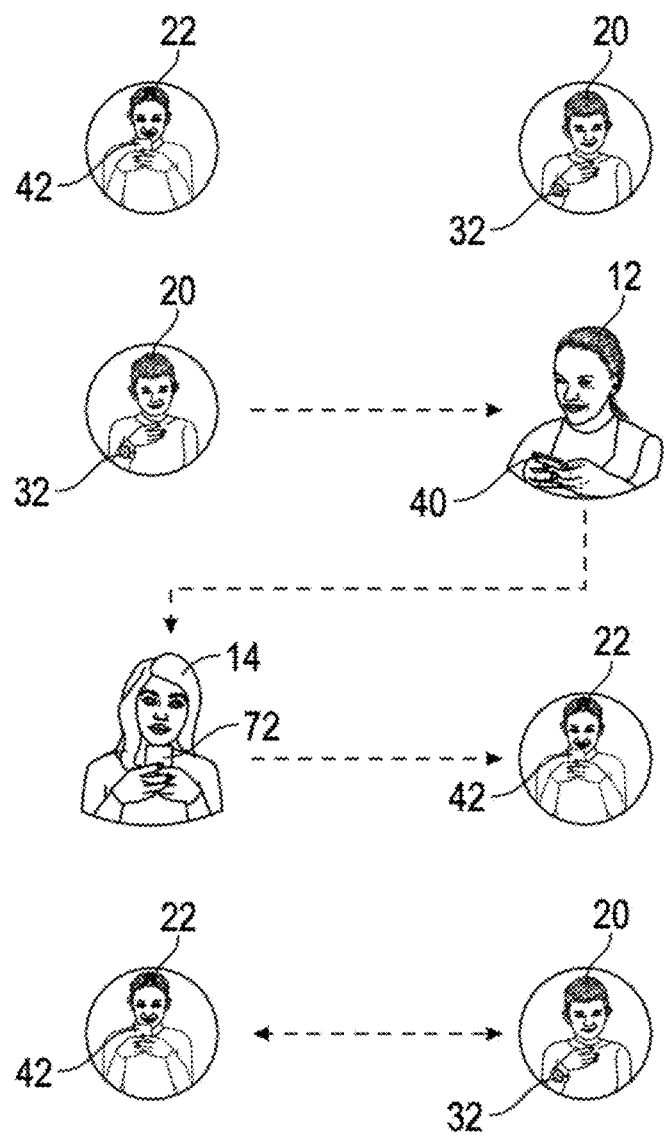
FIG. 4 is a flow diagram showing an approval process for the system of FIG. 1.

Referring to FIG. 4, and as will be discussed, the disclosed concept provides a mechanism by which custodians, such as parents, can better control who their children or other wards are interacting with. This is tremendously useful for protecting children from potentially dangerous actors, such as bullies, child predators, stalkers, and the like. In order to perform this function, the example method further includes a step of receiving an initial request at the computing device 40 of the custodian 12 via the device application 90. Unlike many prior art models, the initial request in accordance with the disclosed concept is preferably independent of a contact-connection status (e.g., whether someone is already connected to someone else, such as by being in that persons contact list or being "friends" in social media) of the custodian user account 104. That is, in one example, and unlike known applications, two parents do not already have to be connected with one another in order to approve of a connection between their children.

Continuing to refer to FIG. 4, in this example, two children (e.g., users 20 and 22 in FIG. 1) initiate the approval process by desiring to connect with each other in the device application 90. In accordance with the disclosed concept, this initial desire is not enough for the users 20, 22 to connect with each other. That is, without bringing in their respective custodians 12, 14, the two users 20, 22 are prevented from connecting with one another in the device application 90. As such, in one example the only manner by which the two users 20, 22 can connect with each other is indirectly through the custodians 12, 14. Thus, the aforementioned initial request is associated with an attempt by the first user 20 to add an additional contact (e.g., the second user 22) to his or her contacts 150, 152, 154, 156, whereby the online interactions of users 20 and 22 can be supervised "shadowed" by user who is the custodian of 20. Put plainly, the first child attempts to add the second child to his contact list so that the two can interact with each other in the device application 90.

However, when this action is taken, the first step is preferably that the request gets sent to the custodian 12 of the first user 20. At this point, the custodian 12 may perform a step of declining the initial request at the computing device 40 via the device application 90 in order to prevent the additional contact (e.g., the second user 22) from being added to the number of contacts 150, 152, 154, 156 for user 20. This may occur when, for example, the custodian 12 does not want his or her child to connect with the other child, possibly because the custodian 12 is trying to protect the user 20 from the influences of the other child. As such, by giving the custodian 12 the power to approve or decline requests for contacts to be added, the custodian 12 is advantageously brought much closer to user 20 in cyber space, thereby better protecting the user 20 and allowing for a significantly safer cyber communication experience.

In an alternative situation, the method may instead include steps of approving the initial request at the computing device 40 via the device application 90, thereby causing a second request to be sent from the computing device 40 of the custodian 12 to a computing device 72 of the other custodian 14. In this situation, the second request is also sent independent of a contact-connection status of the other custodian 14 (e.g., the two parents, unlike known applications, do not have to be connected with one another in the device application 90 to allow their kids to be connected).

In one example, this might present with a first parent (e.g., custodian 12) approving a request, which causes an additional approval request to be sent to a second parent (e.g., custodian 14). This provides two layers of protection for the users 20, 22, who may be children. In this example, the first parent has approved the request, but the method may further include a step of declining the second request at the computing device 72 of the other custodian 14 via the device application 90 in order to prevent the additional contact (e.g., the second user) from being added to the number of contacts 150, 152, 154, 156 for user 20. For example, this may occur where the other custodian 14, for one reason or another, does not want his or her child engaging in cyber communication with the other child, even though the custodian 12 of the other child has allowed for such communication. It will thus be appreciated that both custodians 12, 14 in the illustrated example must actively approve a request in order for their two wards, namely the users 20, 22, to communicate with each other in the device application.

As such, an example process by which the second user 22 gets added to the contact list of the first user 20, or rather gets added to the list of supervised contacts 150, 152, 154, 156 who's interactions with 20 can be shadowed, includes the custodian 12 first approving the initial request, the other custodian 14 approving the second request that was sent from the computing device 40, which sends a third request to the computing device 42 of the second user 22, and a third step of approving the third request at the computing device 42 of the second user 22 via the device application 90. When all this is completed, the second user 22 is caused to be added to the number of contacts 150, 152, 154, 156, and the user 20 of the shadowed user account 144 is allowed to communicate with the second user 22 through the device application 90.

Figure 5:
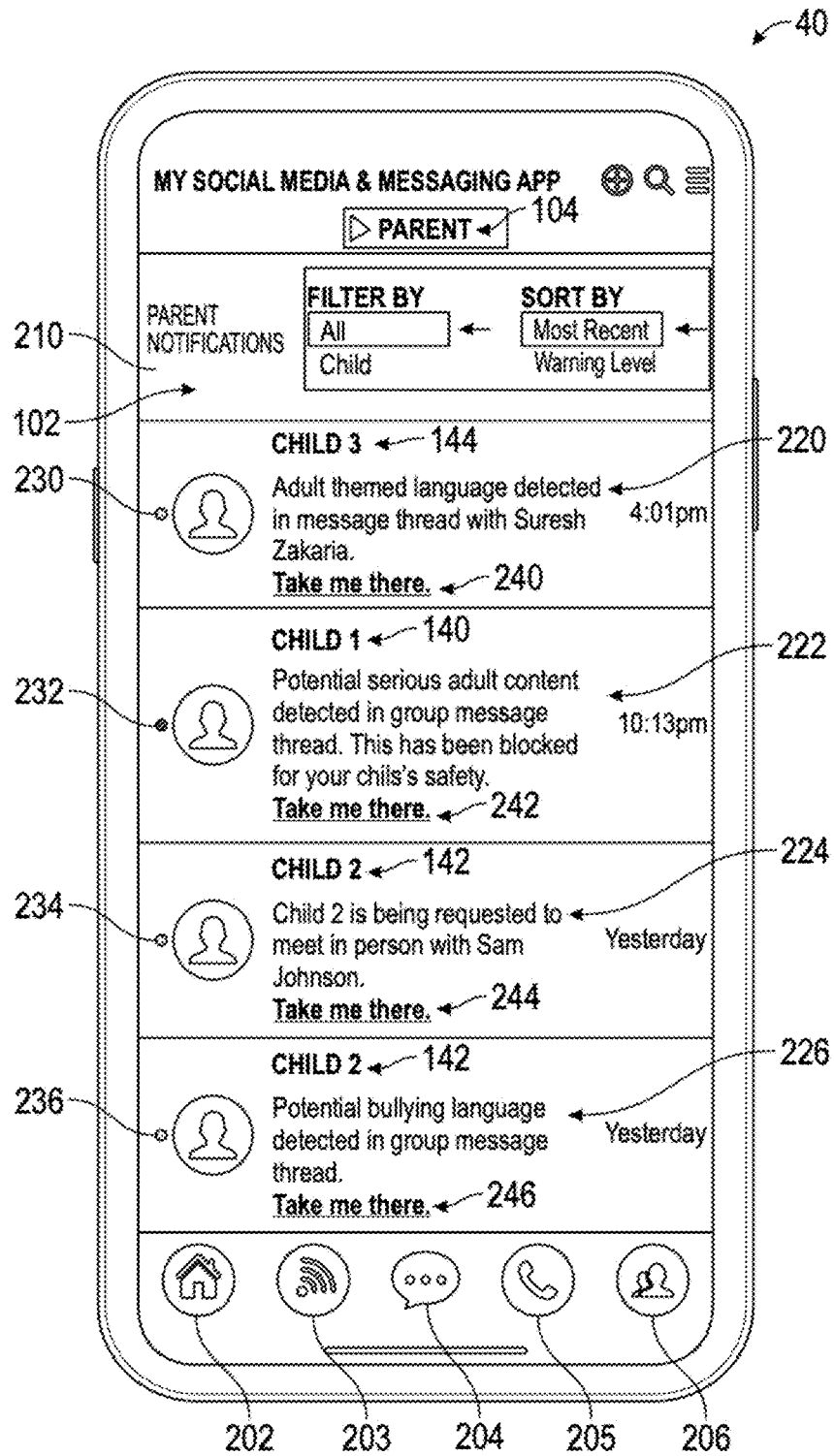
FIG. 5 is a simplified view of the graphical user interface of the computing device of FIG. 2, showing a dashboard page for the custodian user account.
Figure 6:
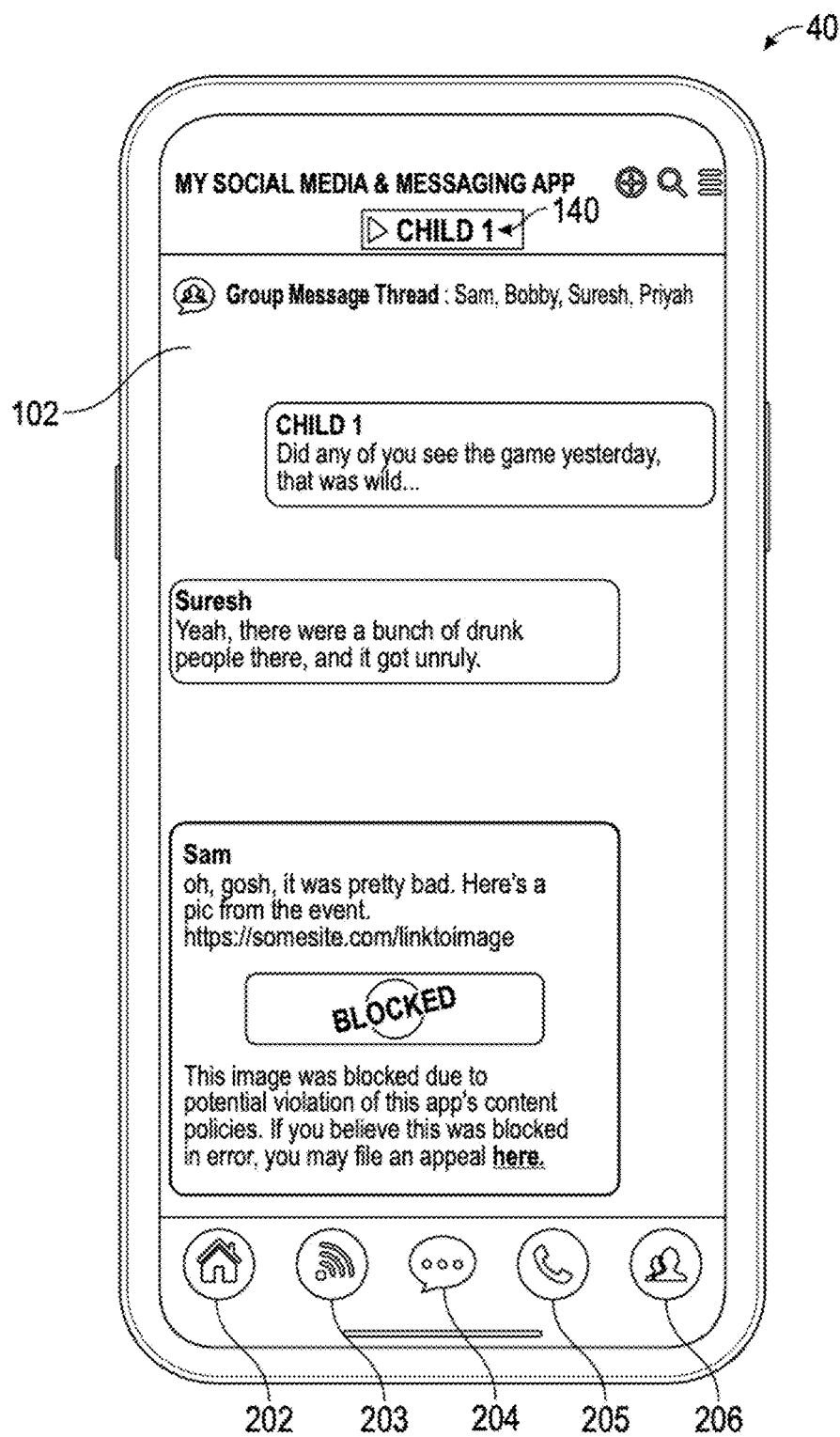
FIG. 6 is a simplified view of the graphical user interface of the computing device of FIG. 2, showing an example conversation thread for one of the shadowed user account by the custodian user account.
Figure 7:
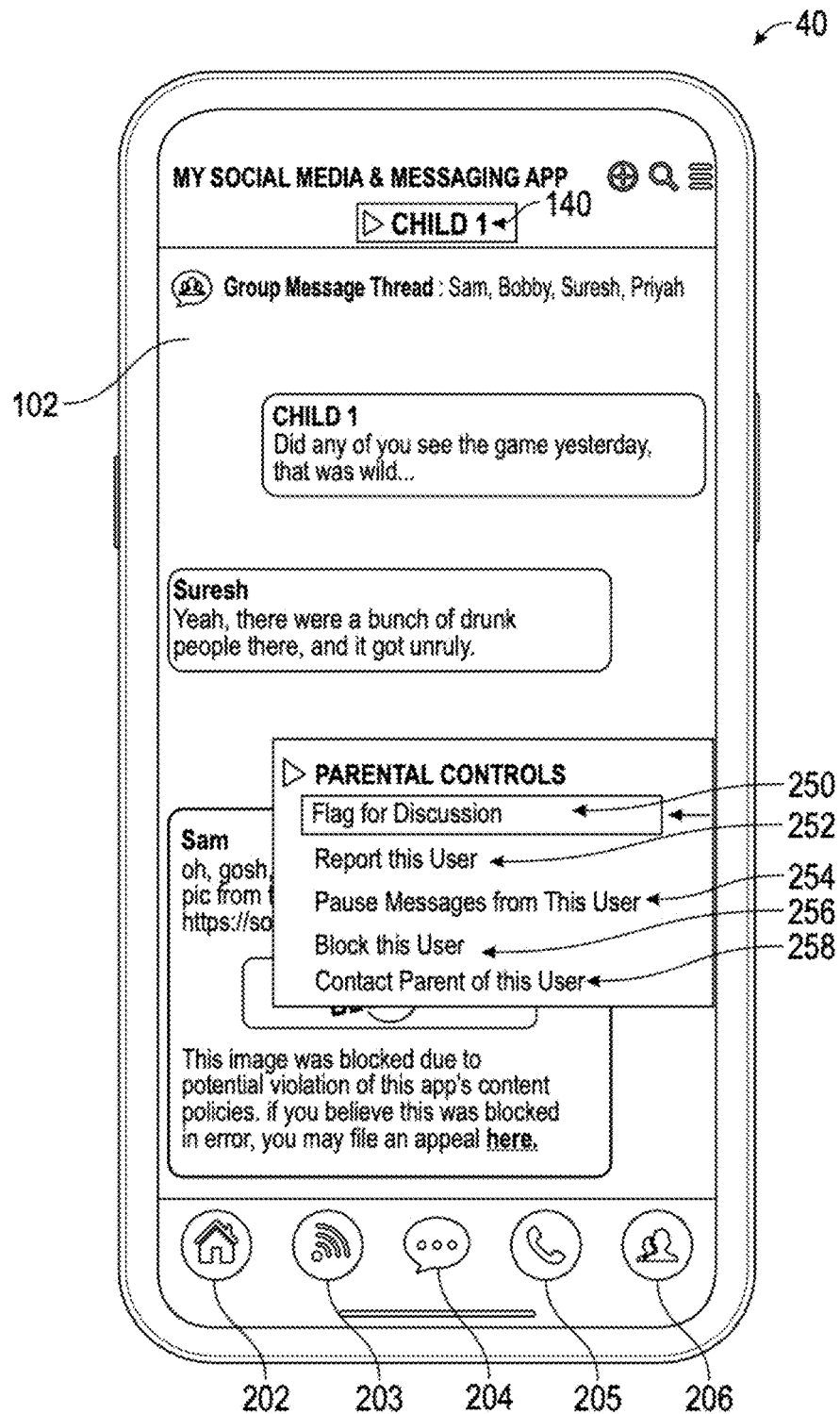
FIG. 7 is another simplified view of the graphical user interface of the computing device of FIG. 2, showing the shadowed user account of FIG. 6, and shown as employed with a number of custodian control options.

FIG. 5 shows the graphical user interface 102 of the computing device 40 of FIG. 2, showing a dashboard page 210 for the custodian user account 104, which can be accessed by selecting a button (e.g., home button 202) after accessing the device application 90. Other non-limiting example buttons include a social media feed button 203, a message button 204, a call button 205, and a friends button 206. The home button 202 can direct a user to a home page where general application information can be accessed. The social media feed button 203 may cause a number of posts to be displayed. The message button 204 may allow a user to directly message other users using the device application 90 with whom they are connected. The call button 205 may allow calls (e.g., video or audio calls) to be made in the device application 90, and the friends button 206 may allow friends in a social network to be searched and added. Additionally, other buttons are contemplated herein.

As shown in FIG. 5, the dashboard page 210 includes a number of message thread summaries 220, 222, 224, 226, a number of custodian indicators 230, 232, 234, 236, and a number of hyperlinks 240, 242, 244, 246. The custodian indicators 230, 232, 234, 236 may be configured similar to the shadow indicators 160, 162, 164, 166, discussed above (e.g., in terms of color, shape, symbol, combination of the foregoing, etc., in order to indicate different types of detected content). It will be appreciated that once certain predetermined content (e.g., inappropriate content) is detected within any of the shadowed user accounts 140, 142, 144, 146, 148, the concerning content (in this case message thread summaries), custodian indicators, and hyperlinks linking to concerning content, will automatically be populated in the dashboard page 210.

Accordingly, the disclosed example includes detecting predetermined content in a conversation thread between a user (e.g., the user 20) of the shadowed user account 144 and one of the shadowed contacts 150, 152, 154, 156, and in response, automatically displaying one of the thread summaries 220, 222, 224, 226, one of the custodian indicators 230, 232, 234, 236, and one of the hyperlinks 240, 242, 244, 246 in the dashboard page 210 via the device application 90. In one example, the hyperlinks 240, 242, 244, 246 correspond to the predetermined content. Put another way, once the predetermined content is detected, the summaries, indicators, and hyperlinks are automatically generated in the dashboard page 210. As a result, the custodian 12 is advantageously provided with a quick and reliable option to sift through any questionable content that his or her kids are engaged with in the device application 90.

And if the custodian 12 desires to review the questionable content flagged on the dashboard page 210, he or she can quickly select one of the hyperlinks 240, 242, 244, 246 and automatically be taken to the location of the questionable content (in this case a conversation thread). As such, the disclosed method may further include a step of, responsive to selecting one of the hyperlinks 240, 242, 244, 246, simultaneously: a) changing the graphical user interface 102 of the computing device 40 from displaying the dashboard page 210 of the custodian user account 104 to displaying the concerning content (in this case a conversation thread between one of the given shadowed user accounts 140, 142, 144, 146, 148 and one of the shadowed contacts 150, 152, 154, 156); and b) changing the operating mode in the device application 90 from the first account context to the second account context. See FIG. 6, for example, which shows such a conversation thread and the detected content therein between the shadowed user account 140 and a number of shadowed contacts.

Moreover, in addition to simply being able to view conversation threads of shadowed users in a read-only mode (e.g., no ability to send messages to one of the shadowed contacts 150, 152, 154, 156), the custodian 12 is advantageously able to comment on and oversee the content (in this case a conversation). See FIG. 7, for example, which depicts an example conversation thread between the shadowed user account 140 and a number of shadowed contacts. As shown, responsive to selecting (e.g., right clicking, toggling, etc.), a number of custodian control options 250, 252, 254, 256, 258 appear in order to allow the custodian 12 to, for example, flag the conversation for discussion with the child, report the conversation, pause messages from a user, block a user, or contact a parent of the user. This capability advantageously provides the custodian 12 with a higher level of oversight with respect to the user 20.

Figure 8:
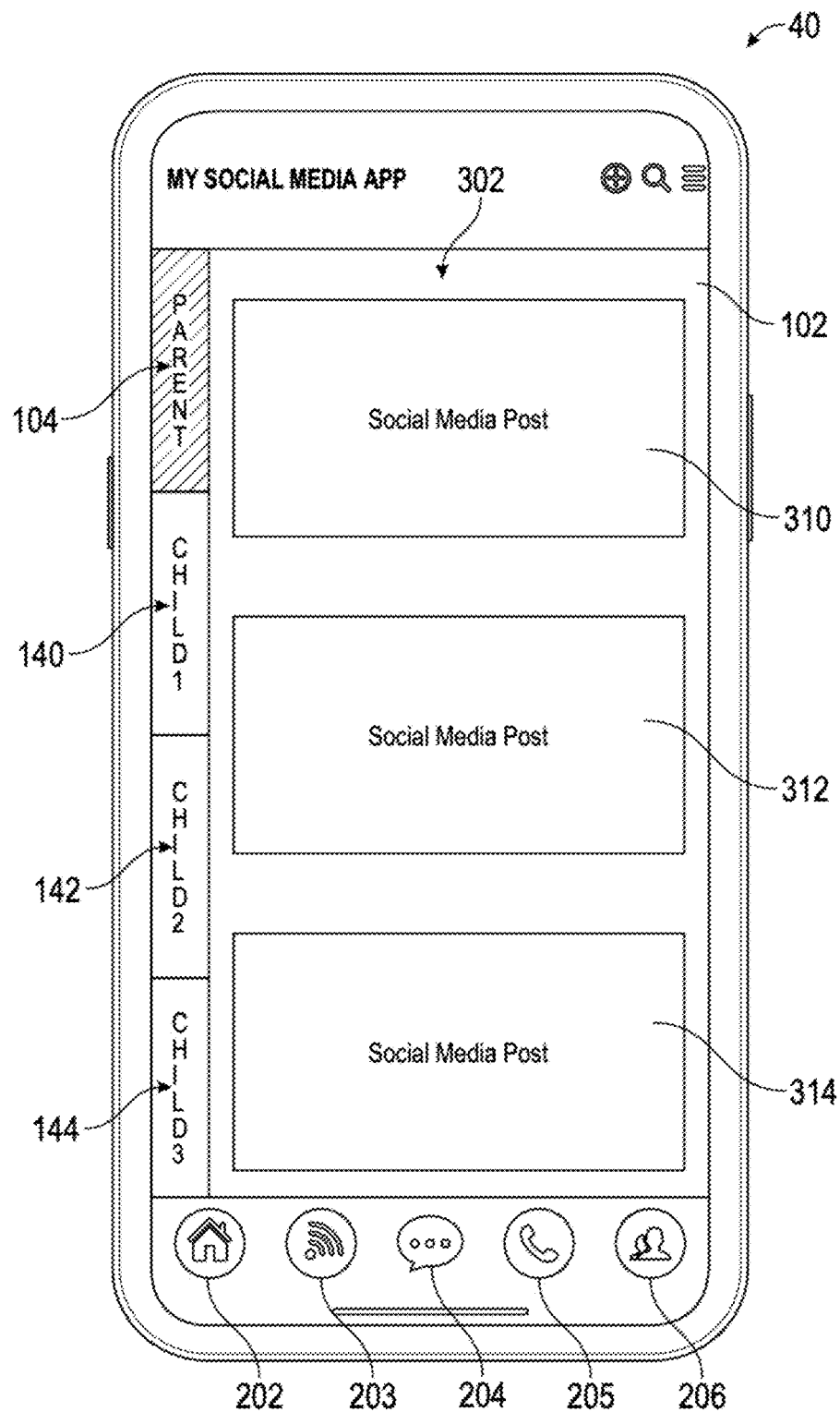
FIG. 8 is a simplified view of the graphical user interface of the computing device of FIG. 2, showing a social media feed for the custodian user account.
Figure 9:
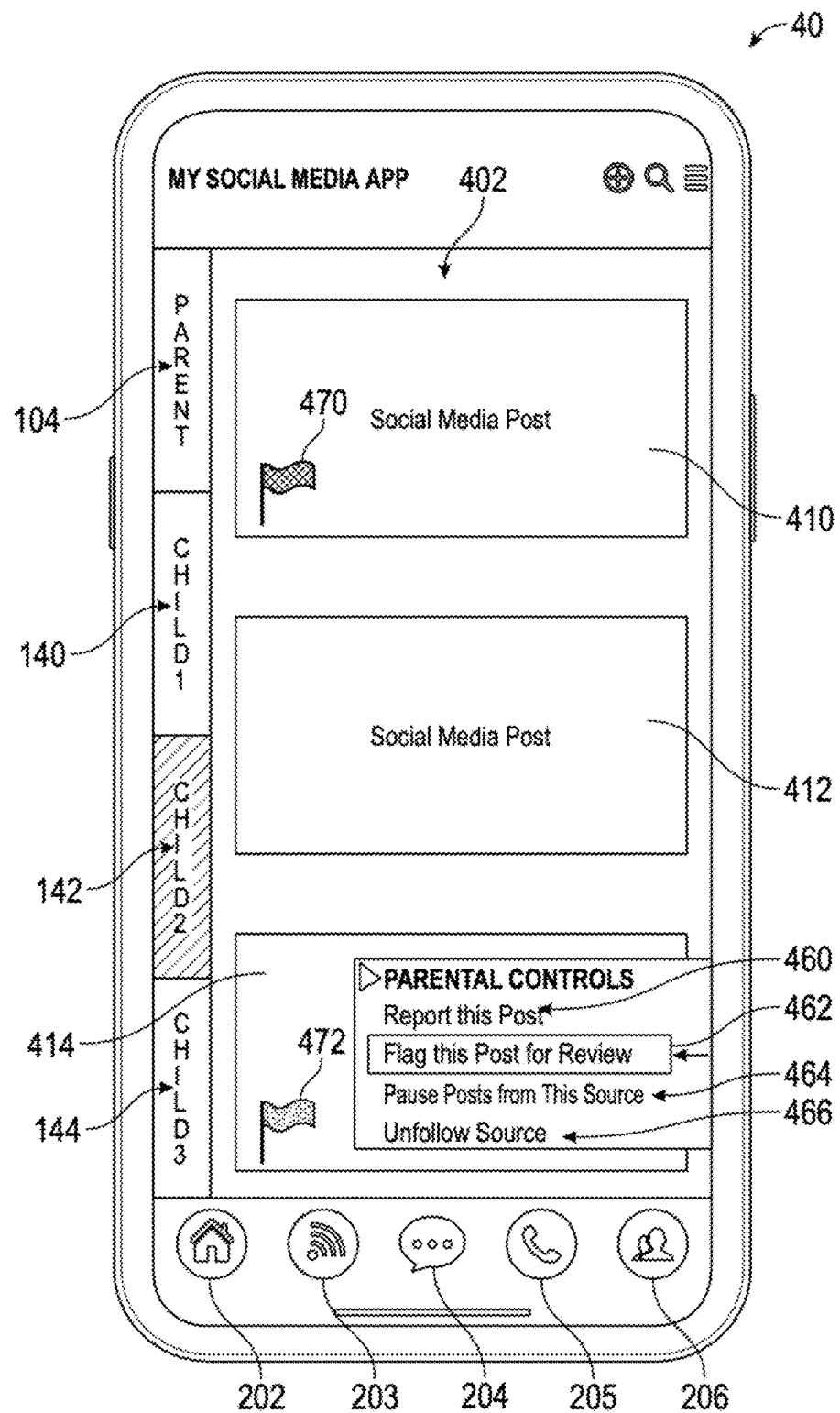
FIG. 9 is a simplified view of the graphical user interface of the computing device of FIG. 2, showing a social media feed for one of the shadowed user accounts of the system, and shown as employed with a number of shadow indicators and a number of custodian control options.

In addition to providing oversight and managerial capability for message related activities, the device application 90 may be configured as a social media application. As such, FIGS. 8 and 9 show social media feeds 302, 402 for the custodian 12 and the shadowed user account 142, respectively. In one example, the first social media feed 302 is generated by content posted by the custodian 12 and the custodian contacts 110, 112, 114, 116, and the second social media feed 402 is generated by content posted by the user 20 and shadowed contacts of the shadowed user account 142. In one example, the content for each of the feeds 302, 402 are a combination of private "Posts" from people who are friends in a network, posts from public personalities or organizations that an individual follows, recommended posts from other public entities that a given person might be interested in based on their likes (e.g. a person who has exhibited an interest in fast cars might receive recommended posts from public entities like Ferrari or a public race car driver). The social media feeds 302, 402 also often contain advertising relevant to a given user's tastes.

Accordingly, the example computer-implemented method may further include a step of generating the first social media feed 302 and the second social media feed 402, the first social feed 302 being associated with the custodian user account 104 and the number of custodian contacts 110, 112, 114, 116, the second social media feed 402 being associated with the shadowed user account 142 and a corresponding number of shadowed contacts (not indicated, but see shadowed contacts 150, 152, 154, 156, discussed above). Furthermore, the first and second social media feeds 302, 402 each preferably include a corresponding plurality of posts 310, 312, 314, 410, 412, 414 each submitted by one of the custodian 12, the user 20 of the shadowed user account 142, and one of the number of custodian contacts 110, 112, 114, 116 or the number of shadowed contacts. Additionally, similar to the shadow capacities associated with the second account context above, the second social media feed 402 is also able to be monitored by the custodian 12.

More specifically, the custodian 12 can readily switch between user accounts by selecting (e.g., touching the graphical user interface 102) any of the user accounts 104, 140, 142, 144. Accordingly, when the shadowed user account 142 is selected, the operating mode of the device application 90 changes from the first account context to the second account context at the same time (e.g., simultaneously) as the social media feed 302 of the custodian 12 changes to the social media feed 402 of the shadowed user account 142.

Additionally, after changing from the custodian user account 104 to the shadowed user account 142, the method preferably further includes displaying a number of custodian control options 460, 462, 464, 466 on the graphical user interface 102 responsive to selecting a post 414 of the second social media feed 404. The method may also include displaying a number of shadow indicators 470, 472. In one example, the custodian control options 460, 462, 464, 466 and the shadow indicators 470, 472 function substantially the same as the custodian control options 170, 172, 174, 176 and the shadow indicators 160, 162, 164, 166 discussed above in association with messaging capabilities of the device application 90. That is, shadow indicators 470, 472 provide an indication of different types of detected content, and the custodian control options 460, 462, 464, 466, responsive to selection by the custodian 12 allow for management actions to be taken by the custodian 12. In one example, custodian control options 460, 462, 464, 466 include reporting options, flagging for review options, pausing posts options, and unfollow options. Additionally, the shadow indicators 470, 472 may be different colors, different shapes, and/or be different symbols, in order to perform the function of indicating different detected content in the posts 410, 414.

Although the disclosed concept has been described in association with the custodian 12 managing the shadowed user accounts 140, 142, 144, 146, 148, it will be appreciated that more than one custodian may be configured to simultaneously monitor the shadowed user accounts 140, 142, 144, 146, 148 together with the custodian 12. For example, another custodian, such as the custodian 10, may monitor the shadowed user accounts 140, 142, 144, 146, 148 with the custodian 12. This is practical in situations where, for example, the two custodians 10, 12 are spouses and are together managing the shadowed user accounts 140, 142, 144, 146, 148, which may be their children or other wards.

It follows that the example computer-implemented method may further include the step of associating the custodian user account 104 with a user account of another custodian 10 in order to allow the shadowed user accounts 140, 142, 144, 146, 148 to be shadowed on the computing device 30 in the same manner by which the shadowed user accounts 140, 142, 144, 146, 148 are shadowed on the computing device 40 of the custodian 12. The method may also include receiving an initial request at the computing device 40 of the custodian 12 and the computing device 30 of the custodian 10 via the device application 90, with the request being independent of the contact-connection status of either of the two custodians 10, 12. In one example, this initial request may be associated with an attempt to add an additional contact to the shadowed contacts 150, 152, 154, 156 by a user 20 of the shadowed user account 144, or any of the other shadowed user accounts 140, 142, 146, 148. Further, in accordance with the disclosed concept, this request is received at the computing devices 30, 40 of each of the custodians 10, 12 via the device application 90, such that each of them has the power to approve or decline a request to add a contact to one of their children's contact lists. This is highly beneficial in that both parents can together have the ability to monitor and manage their kids' cyber activities in the device application 90 as a team.

Stated differently, a second parent may be associated with the user account of a first parent in order to allow either one of the two parents to manage their children's user accounts. In one example, this management capability of either of the two custodians (e.g., parents), may present as the disclosed method including a step of declining the initial request at either of the two computing devices 30, 40 and/or either of the two parents' user accounts, via the device application 90 in order to prevent the additional contact from being added to the shadowed contacts 150, 152, 154, 156.

In another example of the disclosed concept, the computer-implemented method further allows the custodians 10, 12, 14 to remove requirements for custodian approval independent of age, as it relates to allowing supervised/shadowed contacts to be added. This is different than known social media platforms, wherein when children reach 13 years of age they are allowed to create accounts independent of, and not necessarily related to parental accounts, where they have unfettered/unsupervised control over their contact list and online content interactions. Accordingly, the disclosed method may further include a step of manually adjusting settings of one of the shadowed user accounts 140, 142, 144, 146, 148 at the computing device 40 of the custodian 12 via the device application 90 in order to allow a user of the shadowed user accounts 140, 142, 144, 146, 148 to automatically add an additional supervised contact to the number of shadowed contacts without a separate request being sent through the device application 90 to a custodian.

Thus, manually adjusting the settings may be performed independent of an age of the user of the corresponding shadowed user account 140, 142, 144, 146, 148. As discussed above, just because a child reaches the age of 13, or even 17, does not mean that child is emotionally mature enough to be released of parental oversight in the cyber world. As such, by allowing the custodians 10, 12, 14 to manually remove the requirement for parental approval in making connections of their children's or other wards accounts, instead of automatically removing such a requirement, increased parental oversight and care of each of the shadowed user accounts 140, 142, 144, 146, 148 is advantageously able to occur.

In yet a further example embodiment of the disclosed concept, the method further includes providing one of the shadowed user accounts 140, 142, 144, 146, 148 with first and second application features each with respect to a first contact of the number of shadowed contacts 150, 152, 154, 156, and disabling the first application feature via the device application 90 while managing the custodian user account 104. In other words, the custodians 10, 12, 14 can selectively disable features of their children's user accounts with respect to particular contacts, thereby giving them unique abilities to manage cyber activities.

For example, the application feature may include at least one of text capabilities in the device application 90 with respect to any one or more of the shadowed contacts 150, 152, 154, 156, audio call capabilities in the device application 90 with respect to any one or more of the shadowed contacts 150, 152, 154, 156, social media capabilities in the device application 90 with respect to any one or more of the shadowed contacts 150, 152, 154, 156, and other capabilities including music capabilities in the device application 90, video capabilities in the device application 90, movie capabilities in the device application 90, television show capabilities in the device application 90, book or magazine reading capabilities in the device application 90, and website management capabilities in the device application 90. Accordingly, the custodians 10, 12, 14 can selectively control each of these capabilities with respect to the shadowed contacts 150, 152, 154, 156. This may be useful where, for example, a parent is comfortable with his or her child communicating fully with another child, but may want to limit voice and/or video communications with certain adults, such that the adults can only text the child. Additionally, in one example the aforementioned disabling of an application feature is performed on the dashboard page 210 (FIG. 5) of the custodian user account 104.

Moreover, it will also be appreciated that, within the device application 90, the custodian may selectively disable any of the aforementioned application features for a given one of the shadowed user accounts 140, 142, 144, 146, 148. As such, a user (e.g., a child) of the shadowed user account 140 may be permitted to use full (e.g., with all or less than all contacts) messaging capabilities (e.g., and/or other application features) within the device application 90, but not be permitted to use social media capabilities (e.g., and/or other application features) within the device application 90. This across the board selective disablement of an application feature may allow a parent to better protect a child, for example by allowing their child to text and read books in the device application 90, but not allowing them to use social media capabilities or video game capabilities.

Figure 10:
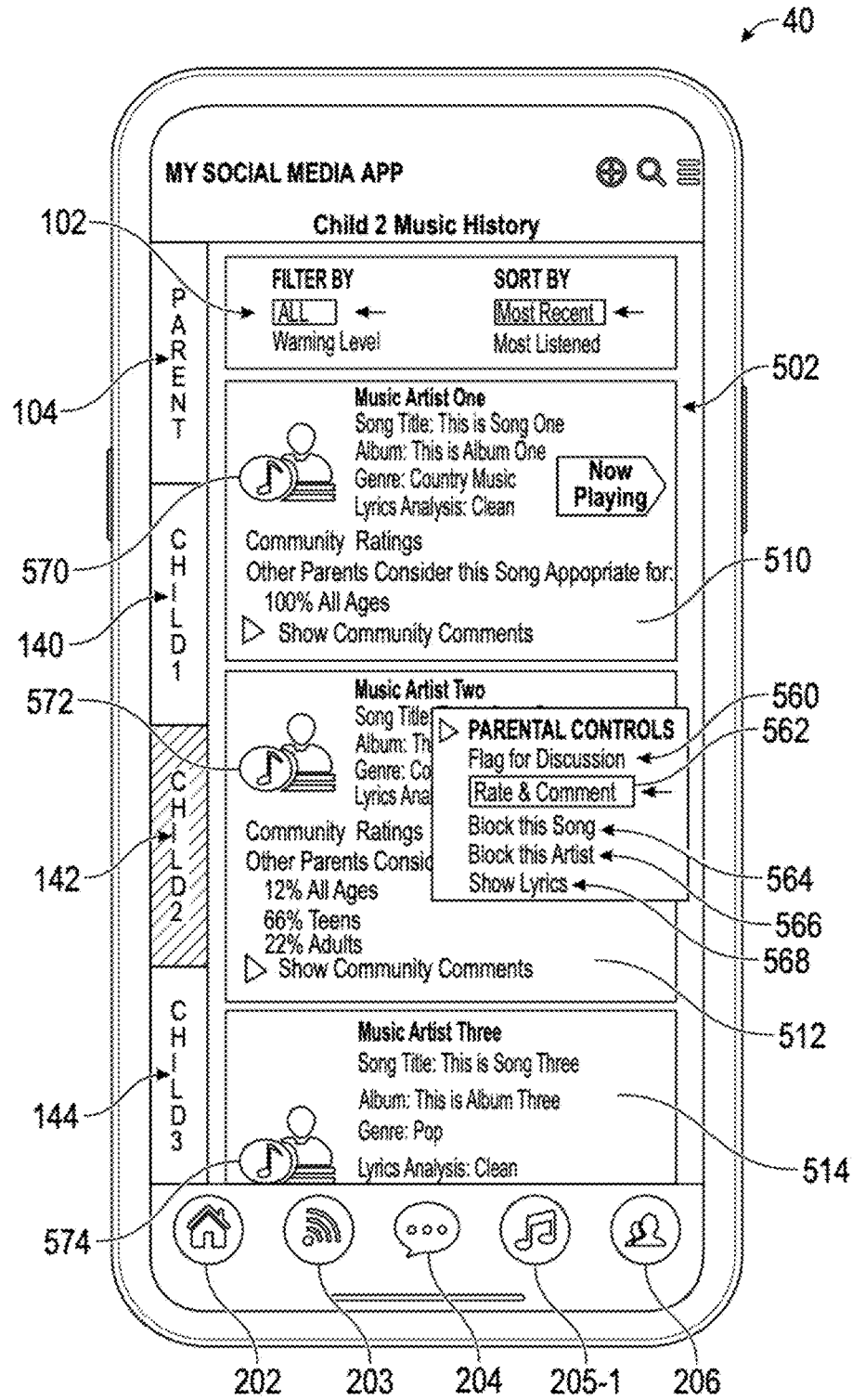
FIG. 10 is a simplified view of the graphical user interface of the computing device of FIG. 2, showing a media library for one of the shadowed user accounts of the system, and shown as employed with a number of shadow indicators and a number of custodian control options.

FIG. 10 shows a media library (e.g., music library 502) for the second shadowed user account 142 on the graphical user interface 102 of the computing device 40. In one example, the custodian 12 can navigate to the music library 502 in the device application 90 by pressing a music button 205-1, which the device application 90 may display in place of the call button 205. The music library 502 includes a plurality of digital contents (e.g., songs 510, 512, 514) that have been downloaded or otherwise imported into the shadowed user account 142. It will be appreciated that the custodian 12 can readily switch between music libraries of the cusodian user account 104 and any of the shadowed user accounts 140, 142, 144 (e.g., and other shadowed user accounts not shown in FIG. 10) by selecting the corresponding account. Accordingly, once the custodian 12 switches from the custodian's user account 104 and one of the shadowed user accounts 140, 142, 144, the operating mode simultaneously changes from the first account context to the second account context.

Accordingly, as shown in FIG. 10, once this switch has been made, the method includes displaying: a) a number of indicators 570, 572, 574 each corresponding to predetermined data within one of the plurality of digital contents (e.g., one of songs 510, 512, 514) of the media library (e.g., music library 502); and/or custodian control options 560, 562, 564, 566, 568 on the graphical user interface 102 responsive to selecting the corresponding digital content (e.g., one of the songs 510, 512, 514). The indicators 570, 572, 574 and the custodian control options 560, 562, 564, 566, 568 each function in the same manner as discussed above in connection with messaging and social media capabilities. That is, they are integrated with the second account context to allow for management and oversight.

As such, it will be appreciated that the computer-implemented method of allowing for management of user accounts in accordance with the disclosed concept may further include generating a first music library (not shown for ease of illustration) and a second music library 502 each associated with a corresponding one of the custodian user account 104 and the shadowed user account 142, where the first and second music libraries 502 (and a music library of the custodian user account 104) each including a plurality of songs 510, 512, 514. The method may also include, after changing from the custodian user account 104 to the shadowed user account 142, displaying the number of custodian control options 560, 562, 564, 566, 568 on the graphical user interface 102 responsive to selecting on one of the songs 510, 512, 514 of the music library 502.

It can thus be appreciated that parents can be provided with better access and control over the music their children listen to, whether their children download music into the device application 90 or activate links provided by one of their contacts. It will also be appreciated that while the disclosed concept has been described in association with messaging, social media, and music management, other capabilities are contemplated. For example and without limitation, the device application 90 is configured to allow for video game management, video management, movie management, television show management, book management, magazine management, e-commerce, and website management, each of which is within the scope of the disclosed concept, although these have not been depicted for purposes of economy of disclosure. In each of these aspects of the device application 90, shadowing and parental control are contemplated, including via shadow indicators and custodian control options in the second account context. Additionally, while FIG. 10 has been described in association with media libraries in the form of a music library 502, it will be appreciated that additional media libraries are contemplated herein, such as video libraries, book libraries, magazine libraries, video game libraries, etc.

Figure 11:
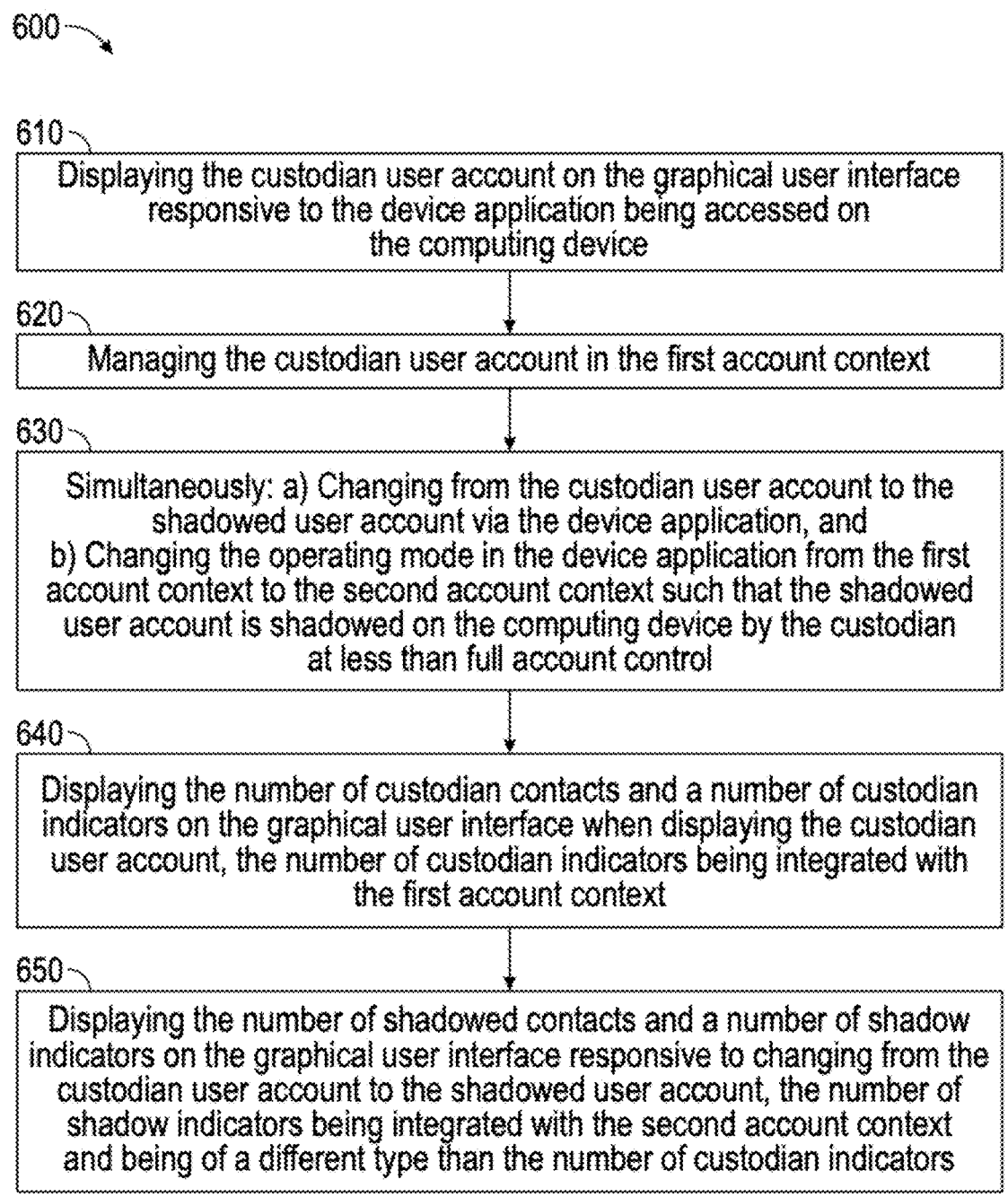
FIG. 11 is a flow chart of an example computer-implemented method for allowing a custodian to manage a plurality of user accounts, in accordance with one non-limiting embodiment of the disclosed concept.

FIG. 11 shows a flow chart of the disclosed computer-implemented method 600. Accordingly, the disclosed method 600 may include a first step 610 of displaying the custodian user account 104, a second step 620 of managing the custodian user account 104 in the first account context, and a third step 630 of simultaneously changing from the custodian user account 104 to one of the shadowed user accounts 140, 142, 144, 146, 148 as well as changing to the second account context in order to shadow one of the shadowed user accounts 140, 142, 144, 146, 148 at less than full account control. Additionally, the method 600 may also include a fourth step 640 of displaying the custodian contacts 110, 112, 114, 116 and the custodian indicators 120, 122 when displaying the custodian user account 104, and a fifth step 650 of displaying the shadowed contacts 150, 152, 154, 156 and the shadow indicators 160, 162, 164, 166 responsive to changing from the custodian user account 104 to one of the shadowed user accounts 140, 142, 144, 146, 148. Other method steps as discussed hereinabove are contemplated. However, for purposes of economy of disclosure, only the method steps 610, 620, 630, 640, 600 are depicted in FIG. 11.

Figure 12:
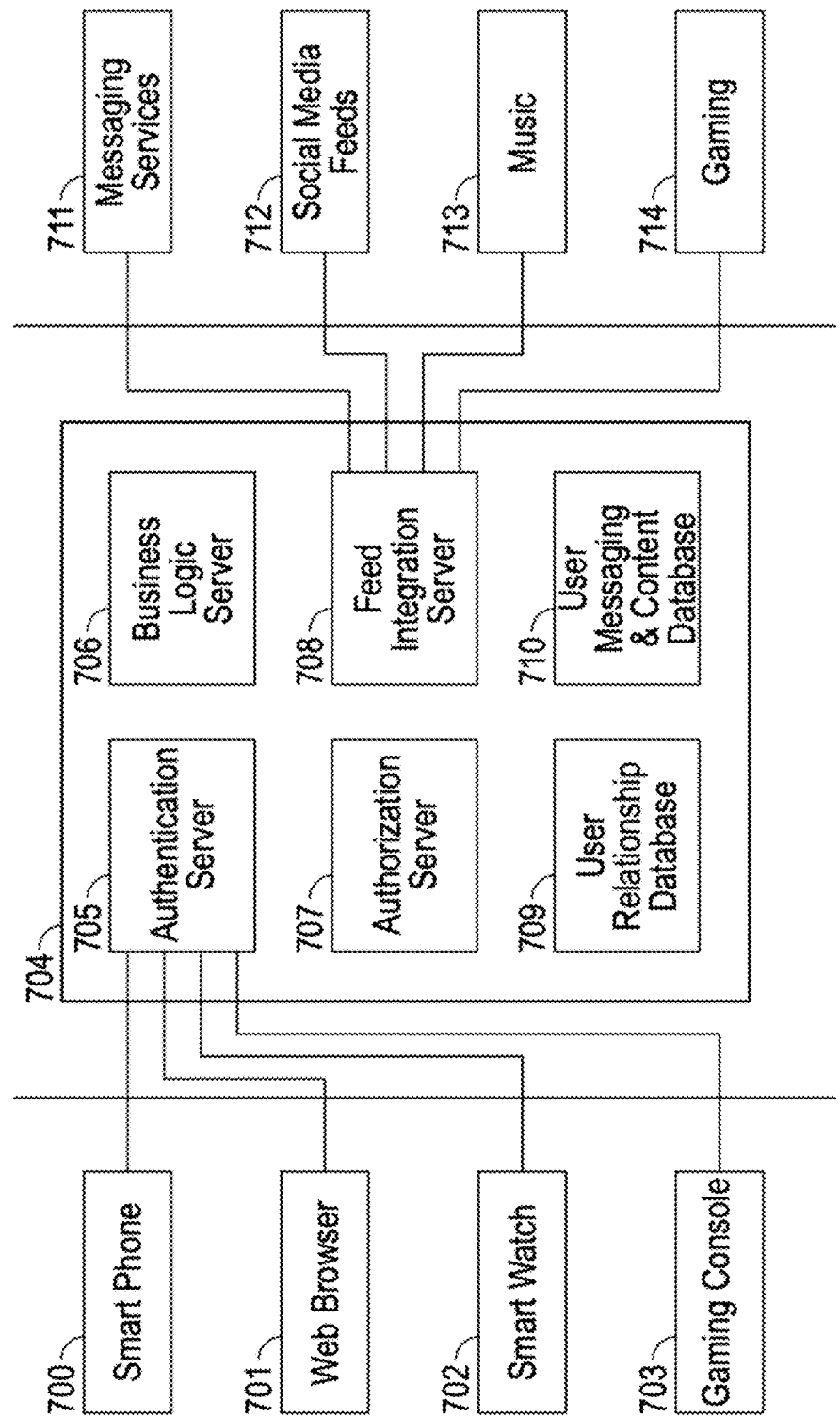
FIG. 12 is a simplified view of a server environment for the system of FIG. 1.

FIG. 12 shows a simplified view of a server environment for the system 2 (FIG. 1). In one example, a custodian opens the device application 90 on a smart phone 700. The custodian could also access the device application 90 via other computing devices, such as a web browser on a desktop computer 701, a smart watch 702, or a gaming console web browser or app 703. Other devices as discussed above in connection with FIG. 1, such as tablets, are also contemplated.

In one example, the device application 90 makes a network call to a custodian account and management oversight server environment 704 for the system 2. A first step may include the environment 704 identifying the custodian using an authentication server 705, in which the custodian provides credentials, such as a username and password. Once the custodian has been authenticated, the environment 704 determines what permissions are granted to this custodian using an authorization server 707. Next, the environment 704 retrieves the custodian's relationships with other users including a list of dependents from a user relationship database 709. At this point the environment 704 knows the custodian, his/her relationships and what permissions the custodian has been granted.

As the custodian navigates the device application to perform tasks, a business logic server 706 is invoked. The business logic server 706 keeps track of the user context and whether the custodian is viewing his/her own data or shadowing a dependent. Depending on the user context, the business logic server 706 queries for the appropriate user messages or content from a user messaging & content database 710. If the custodian changes context to a different user or to themselves, the business logic server 706 queries for the user messages and/or content matching the new user context.

It will be appreciated that in the background a feed integration server 708 is constantly ingesting user activity from applicable media services such as messaging services 711, social media feeds 712, music 713, gaming 714, and inserting new user messages into the user messaging & content database 710. Other applicable media services (e.g., web browsing, book viewing, etc.), as discussed above, are also contemplated herein. This allows the environment 704 to operate against a wide variety of media services in a uniform, normalized fashion.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality can be separated or combined in blocks differently in various implementations of the disclosure or described with different terminology. These and other variations, modifications, additions, and improvements can fall within the scope of the disclosure as defined in the claims that follow.

What is claimed is:

1. A computer-implemented method for allowing a custodian to manage a plurality of user accounts of a device application on a first computing device via [a] the device application, the plurality of user accounts comprising a custodian user account and a shadowed user account belonging to a user other than the custodian, the custodian user account being associated with a number of custodian contacts, the shadowed user account comprising a number of shadowed contacts and a number of shadow indicators, the number of shadowed contacts comprising a first contact and a second contact, the shadowed user account being managed at less than full account control by the custodian, the first computing device comprising a graphical user interface, the device application having an operating mode configured to change between a first account context corresponding to full account control, and a second account context corresponding to less than full account control in which messages are presented in a read-only mode, the computer-implemented method comprising:

displaying the custodian user account on the graphical user interface responsive to the device application being accessed on the first computing device;

displaying the number of custodian contacts and a number of custodian indicators on the graphical user interface when displaying the custodian user account, the number of custodian indicators being integrated with the first account context;

managing the custodian user account in the first account context; and simultaneously: a) changing from the custodian user account to the shadowed user account via the device application without a login process being performed on the first computing device, and b) changing the operating mode in the device application from the first account context to the second account context such that the shadowed user account is shadowed on the first computing device by the custodian at less than full account control;

displaying a representation of the shadowed user account on the graphical user interface, the representation being the same as a representation of the shadowed user account displayed on a graphical user interface of a second computing device of the user other than the custodian, thereby allowing the custodian to see on the first computing device externally provided data from at least the first contact and the second contact that the shadowed user account sees on the second computing device;

dynamically detecting potentially dangerous content associated with the first contact via a machine-learning algorithm, and in response, determining with the machine-learning algorithm that the first contact is a dangerous actor and/or that the potentially dangerous content is indeed dangerous content;

completing sentiment analysis with the machine-learning algorithm in response to dynamically detecting in order to assess a mood of the first contact or a mood of the user other than the custodian;

displaying the first contact, the second contact, and the number of shadow indicators on the graphical user interface responsive to changing from the custodian user account to the shadowed user account, the number of shadow indicators being integrated with the second account context and being of a different type than the number of custodian indicators, one of the number of shadow indicators being displayed with respect to the first contact in response to detecting the potentially dangerous content;

displaying a plurality of custodian control options on the graphical user interface responsive to selecting the first contact, each of the plurality of custodian control options being integrated with the second account context;

selecting one of the plurality of custodian control options in order to allow the custodian to oversee and manage the shadowed user account with respect to the first contact, including deleting content determined to be dangerous; and using the machine-learning algorithm including the sentiment analysis, and the selecting of the one of the plurality of custodian control options, in order to prevent future related dangerous content and content from the dangerous actor from being delivered to the shadowed user, wherein the device application is either a messaging application including sending and receiving of content-based messages, a social media application with messaging capabilities, or a gaming application with messaging capabilities.

2. The computer-implemented method according to claim 1, wherein at least one of the number of custodian indicators corresponds to an unread message, wherein the number of shadow indicators comprises a first shadow indicator and a second shadow indicator, wherein the first shadow indicator corresponds to first predetermined data associated with the first contact, wherein the second shadow indicator corresponds to second predetermined data associated with the second contact, and wherein the first predetermined data is different than the second predetermined data.

3. The computer-implemented method according to claim 1, further comprising:

detecting predetermined content between the user other than the custodian and the first contact of the number of shadowed contacts, and in response, automatically displaying a hyperlink corresponding to the predetermined content in a dashboard page of the custodian user account via the device application.

4. The computer-implemented method according to claim 3, further comprising:

responsive to selecting the hyperlink, simultaneously: a) changing the graphical user interface of the computing device from displaying the dashboard page of the custodian user account to displaying the predetermined content; and b) changing the operating mode in the device application from the first account context to the second account context.

5. A computer-implemented method for allowing a custodian to manage a plurality of user accounts of a social media application on a first computing device via the social media application, the plurality of user accounts comprising a custodian user account and a shadowed user account belonging to a user other than the custodian, the custodian user account being associated with a number of custodian contacts, the shadowed user account comprising a number of shadowed contacts and a number of shadow indicators, the shadowed user account being managed at less than full account control by the custodian, the computing device comprising a graphical user interface, the social media application having an operating mode configured to change between a first account context corresponding to full account control, and a second account context corresponding to less than full account control in which content is presented in a read-only mode, the computer-implemented method comprising:

displaying the custodian user account on the graphical user interface responsive to the social media application being accessed on the computing device;

managing the custodian user account in the first account context;

simultaneously: a) changing from the custodian user account to the shadowed user account via the social media application, and b) changing the operating mode in the social media application from the first account context to the second account context such that the shadowed user account is shadowed on the computing device by the custodian at less than full account control;

generating a first social media feed and a second social media feed, the first and second social media feeds each comprising a corresponding plurality of posts each submitted by one of the custodians, the user other than the custodian, and one of the number of custodian contacts or the number of shadowed contacts;

displaying a representation of the shadowed user account on the graphical user interface, the representation being the same as a representation of the shadowed user account displayed on a graphical user interface of a second computing device of the user of the shadowed user account, thereby allowing the custodian to see on the first computing device externally provided data corresponding to the second social media feed that the shadowed user account sees on the second computing device;

dynamically detecting potentially dangerous content associated with the second social media feed via a machine-learning algorithm, and in response, determining with the machine-learning algorithm that a dangerous actor is associated with the second social media feed and/or that the potentially dangerous content is indeed dangerous content;

displaying the plurality of shadowed posts of the second social media feed, and the number of shadow indicators on the graphical user interface responsive to changing from the custodian user account to the shadowed user account, the number of shadow indicators being integrated with the second account context, one of the number of shadow indicators being displayed with respect to the plurality of posts of the second social media feed in response to detecting the potentially dangerous content;

after changing from the custodian user account to the shadowed user account, displaying a number of custodian control options on the graphical user interface responsive to selecting the second social media feed;

selecting one of the number of custodian control options in order to allow the custodian to oversee and manage the shadowed user account with respect to the second social media feed, including deleting content determined to be dangerous; and using the machine-learning algorithm and the selecting of the one of the plurality of custodian control options, in order to prevent future related dangerous content and content from the dangerous actor from being delivered to the shadowed user.

6. The computer-implemented method according to claim 1, further comprising:

displaying first content on the graphical user interface in a read and write mode responsive to selecting a third contact of the number of custodian contacts; and displaying second content on the graphical user interface in the read-only mode responsive to selecting the first contact, the second content corresponding to at least one of text data, image data, audio data, and video data.

7. The computer-implemented method according to claim 1, further comprising:

receiving an initial request at the first computing device via the device application, the initial request being associated with an attempt to add an additional contact to the number of shadowed contacts by the user other than the custodian, the initial request being independent of a contact-connection status of the custodian user account.

8. The computer-implemented method according to claim 7, further comprising:
    declining the initial request at the first computing device of the custodian via the device application in order to prevent the additional contact from being added to the number of shadowed contacts.

9. The computer-implemented method according to claim 7, further comprising:
    approving the initial request at the first computing device of the custodian via the device application, thereby causing a second request to be sent from the first computing device of the custodian to a computing device of an additional user, the second requ est being independent of a contact-connection status of the additional user; and
    declining the second request at the computing device of the additional user via the device application in order to prevent the additional contact from being added to the number of shadowed contacts.

10. The computer-implemented method according to claim 7, further comprising:
    approving the initial request at the first computing device of the custodian via the device application, thereby causing a second request to be sent from the computing device of the custodian to a computing device of an additional user, the second request being independent of a contact-connection status of the additional user;
    approving the second request at the computing device of the additional user via the device application, thereby causing a third request to be sent from the computing device of the additional user to a computing device of the additional contact; and
    approving the third request at the computing device of the additional contact via the device application, thereby: a) causing the additional contact to be added to the number of shadowed contacts, and b) allowing the user other than the custodian to communicate with the additional contact.

11. The computer-implemented method according to claim 1, further comprising:
    manually adjusting settings of the shadowed user account at the first computing device of the custodian via the device application in order to allow the user other than the custodian to automatically add an additional contact to the number of shadowed contacts without a separate request being sent through the device application, wherein manually adjusting settings is performed independent of an age of the user other than the custodian.

12. The computer-implemented method according to claim 1, wherein the custodian is a first custodian, wherein the method further comprises:
    associating the custodian user account with a user account of a second custodian in order to allow the shadowed user account and a number of the plurality of user accounts to be shadowed on a computing device of the second custodian in the same manner by which the shadowed user account is shadowed on the first computing device of the first custodian; and
    receiving an initial request at the first computing device of the first custodian and the computing device of the second custodian via the device application, the initial request being associated with an attempt to add an additional contact to the number of shadowed contacts by the user other than the custodian, the initial request being independent of a contact-connection status of either the custodian user account or the user account of the second custodian.

13. The computer-implemented method according to claim 12, further comprising:
    declining the initial request at either the first computing device of the first custodian or the computing device of the second custodian via the device application in order to prevent the additional contact from being added to the number of shadowed contacts.

14. The computer-implemented method according to claim 1, further comprising:
    providing the shadowed user account with a first application feature and a second application feature each with respect to the first contact of the number of shadowed contacts; and
    disabling the first application feature with respect to the first contact via the device application while managing the custodian user account.

15. The computer-implemented method according to claim 14, wherein the first application feature comprises at least one of text capabilities in the device application, audio call capabilities in the device application, social media capabilities in the device application, music capabilities, video capabilities in the device application, video game capabilities, movie capabilities in the device application, television show capabilities in the device application, book or magazine reading capabilities in the device application, e-commerce capabilities in the device application, and website management capabilities in the device application, and wherein disabling the first application feature is performed on a dashboard page of the custodian user account.

16. A system for allowing a custodian to manage a plurality of user accounts of a device application, the plurality of user accounts comprising a custodian user account and a shadowed user account belonging to a user other than the custodian, the custodian user account being associated with a number of custodian contacts, the shadowed user account comprising a number of shadowed contacts and a number of shadow indicators, the number of shadowed contacts comprising a first contact and a second contact, the shadowed user account being managed at less than full account control by the custodian, the system comprising:
    a first computing device for running a device application, the computing device comprising a graphical user interface, the device application having an operating mode configured to change between a first account context corresponding to full account control, and a second account context corresponding to less than full account control in which messages are presented in a read-only mode, the computing device being programmed to:
    display the custodian user account on the graphical user interface responsive to the device application being accessed,
    display the number of custodian contacts and a number of custodian indicators on the graphical user interface when displaying the custodian user account, the number of custodian indicators being integrated with the first account context,
    manage the custodian user account in the first account context,
    simultaneously: a) change from the custodian user account to the shadowed user account via the device application; without a login process being performed on the first computing device, and b) change the operating mode in the device application from the first account context to the second account context such that the shadowed user account is shadowed on the computing device by the custodian at less than full account control, display a representation of the shadowed user account on the graphical user interface, the representation being the same as a representation of the shadowed user account displayed on a graphical user interface of a second computing device of the user other than the custodian, thereby allowing the custodian to see on the first computing device externally provided data from at least the first contact and the second contact that the shadowed user account sees on the second computing device;

dynamically detect potentially dangerous content associated with the first contact via a machine-learning algorithm, and in response, determining with the machine-learning algorithm that the first contact is a dangerous actor and/or that the potentially dangerous content is indeed dangerous content;

complete sentiment analysis with the machine-learning algorithm in response to dynamically detecting in order to assess a mood of the first contact or a mood of the user other than the custodian;

display the first contact, the second contact, and the number of shadow indicators on the graphical user interface responsive to changing from the custodian user account to the shadowed user account, the number of shadow indicators being integrated with the second account context and being of a different type than the number of custodian indicators, one of the number of shadow indicators being displayed with respect to the first contact in response to detecting the potentially dangerous content;

display a plurality of custodian control options on the graphical user interface responsive to selecting the first contact, each of the plurality of custodian control options being integrated with the second account context;

select one of the plurality of custodian control options in order to allow the custodian to oversee and manage the shadowed user account with respect to the first contact, including deleting content determined to be dangerous; and use the machine-learning algorithm, including the sentiment analysis, and the selecting of the one of the plurality of custodian control options, in order to prevent future related dangerous content and content from the dangerous actor from being delivered to the shadowed user, wherein the device application is either a messaging application including sending and receiving of content-based messages, a social media application with messaging capabilities, or a gaming application with messaging capabilities.

17. The computer-implemented method according to claim 1, wherein the dangerous content is one of pornographic material, bullying language, language used by terrorist groups for recruitment, stalker language, and child predator language.

18. The system according to claim 16, wherein the dangerous content is one of pornographic material, bullying language, language used by terrorist groups for recruitment, stalker language, and child predator language.

* * * * *